United States Patent [19]

Mochizuki

[11] Patent Number: 5,805,293
[45] Date of Patent: Sep. 8, 1998

[54] HADAMARD TRANSFORM CODING/DECODING METHOD AND APPARATUS FOR IMAGE SIGNALS

[75] Inventor: Takashi Mochizuki, Tokyo, Japan

[73] Assignee: NEC Corporation, Tokyo, Japan

[21] Appl. No.: 593,527

[22] Filed: Jan. 30, 1996

[30] Foreign Application Priority Data

Jan. 30, 1995 [JP] Japan .................................. 7-033135

[51] Int. Cl.$^6$ ........................................ H04N 1/411
[52] U.S. Cl. ........................ 358/262.1; 358/426; 382/232; 382/248
[58] Field of Search .......................... 358/262.1, 261.1, 358/261.2, 261.3, 426, 430, 432, 433; 382/232, 239, 245, 246, 248

[56] References Cited

U.S. PATENT DOCUMENTS

| 4,463,377 | 7/1984 | Meyer-Ebrechte et al. | ............ 358/133 |
| 5,455,841 | 10/1995 | Hazu | ..................... 375/240 |

FOREIGN PATENT DOCUMENTS

| 0 077 089 | 4/1983 | European Pat. Off. . |
| 2-62993 | 12/1990 | Japan . |

OTHER PUBLICATIONS

Fukinuki et al., "Intraframe Image Coding by Cascaded Hadamard Transforms", IEEE Transaction on communications, vol. COM–21, No. 3, pp. 175–180, Mar. 1973.

Fukinuki, "Multidimensional Signal Processing of TV Signals", pp. 247–250, Nov. 15, 1988.

Fukinuki, "Digital Signal Processing of Images", pp. 181–193, Jan. 27, 1992.

*Primary Examiner*—Thomas D. Lee
*Attorney, Agent, or Firm*—Foley & Lardner

[57] ABSTRACT

In a Hadamard transform coding/decoding method and apparatus, transform coefficients which are obtained through an Hadamard transform operation in an Hadamard transformer 3 are subjected to a bit extract (delete) operation in a bit delete unit 4 to extract 1 bit from the least significant bits of the transform coefficients, 4 bits from the second least significant bits and 7 bits from the third least significant bits and then the extracted bits are output as supplement information Ysup. In addition, the transform coefficients whose first, second and third least significant bits are deleted, are output from the bit delete unit 4. A bit restoring unit 7 supplements the first, second and third least significant bits of all the transform coefficients on the basis of the 1-bit information, 4-bit information and 7-bit information per block of the supplement information Ysup, which represent the first, second and third least significant bits of the transform coefficients, thereby restoring the transform coefficients. The restored transform coefficients are output to an Hadamard inverse transformer 8 to obtain an image signal.

11 Claims, 20 Drawing Sheets

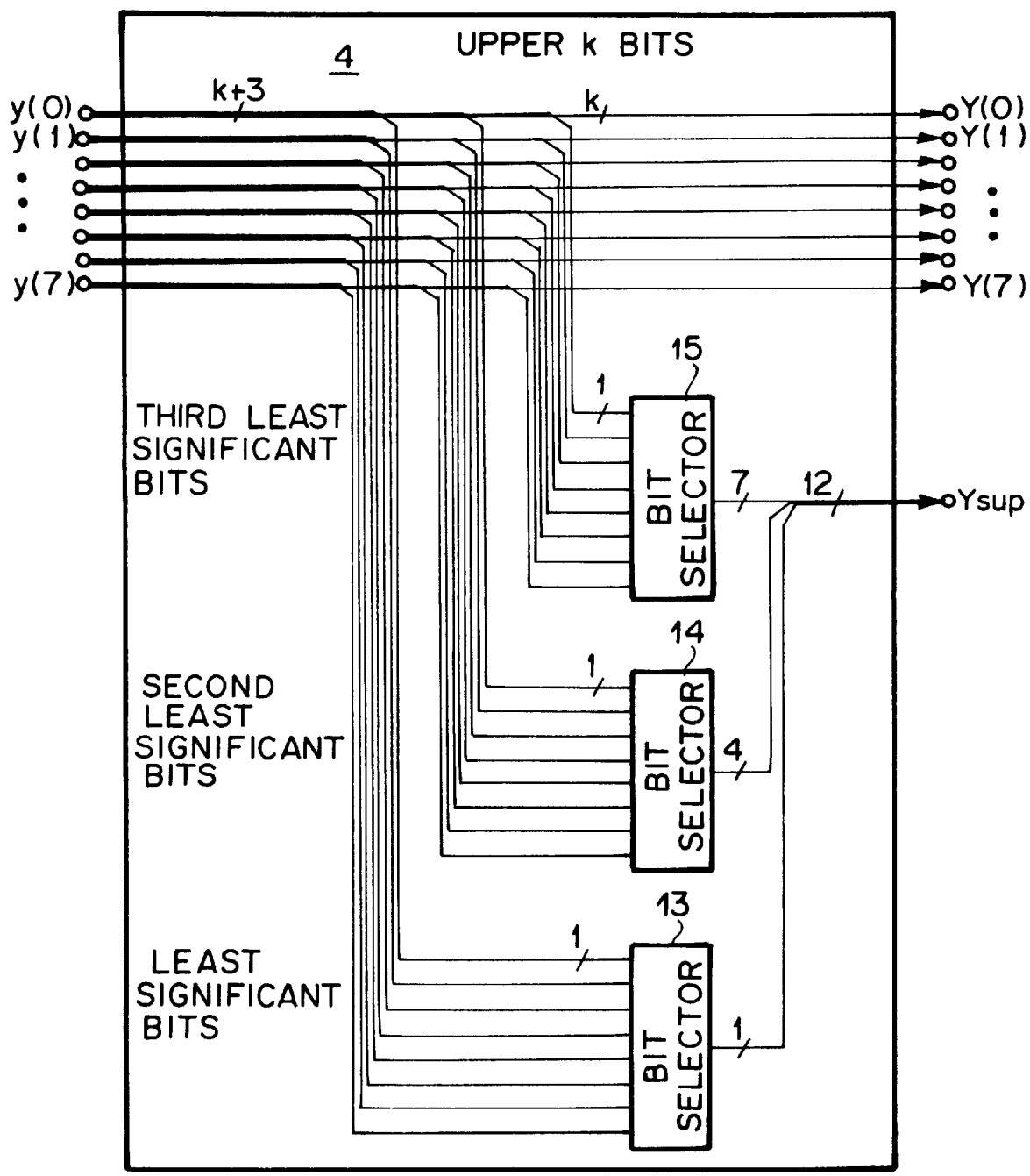

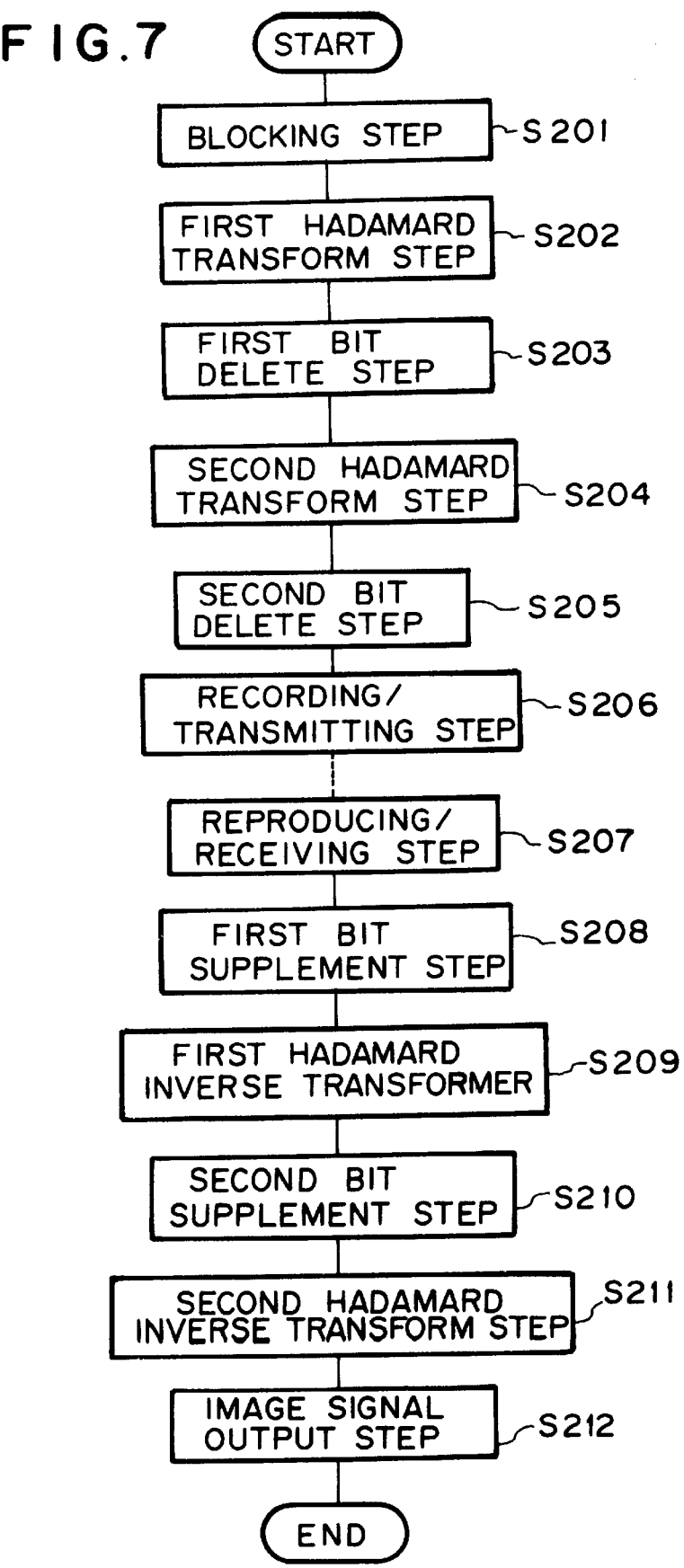

FIG.8
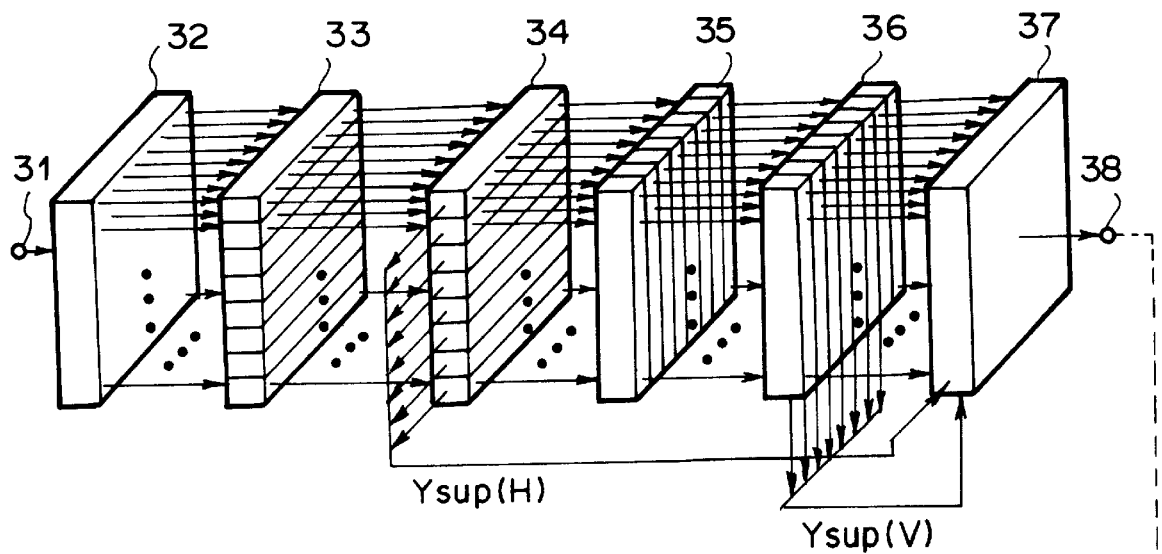
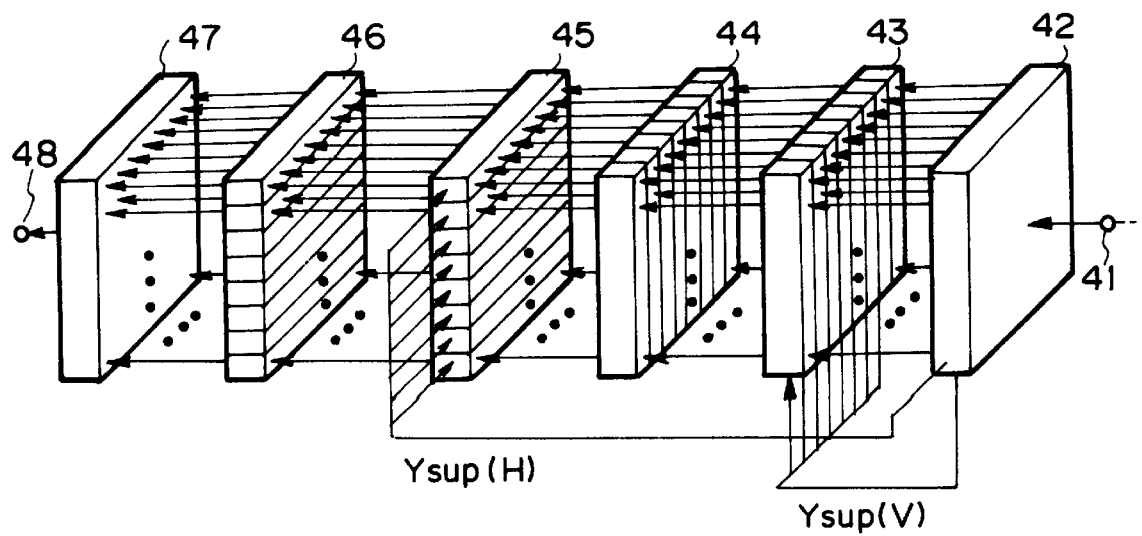

FIG. 10
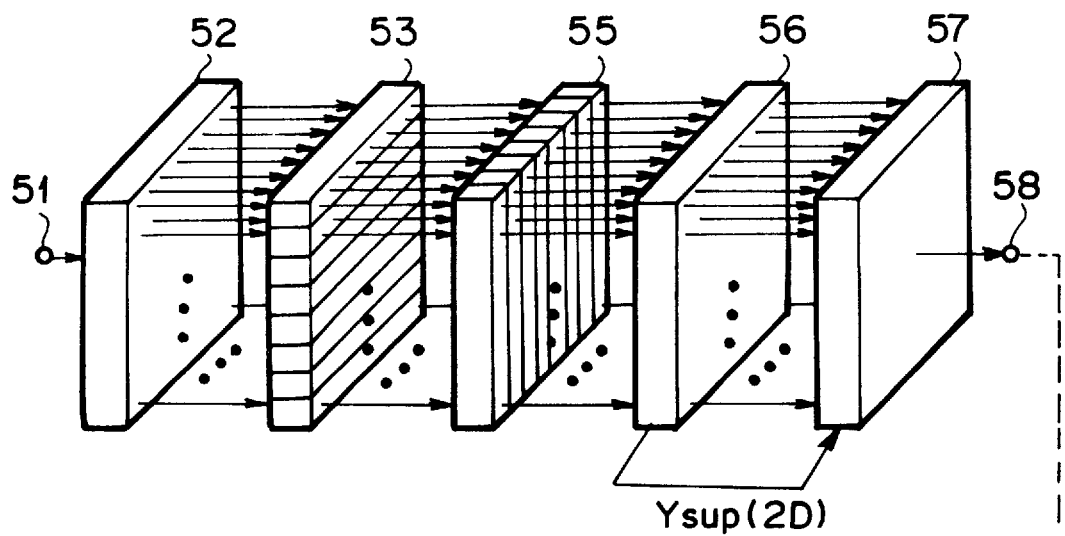
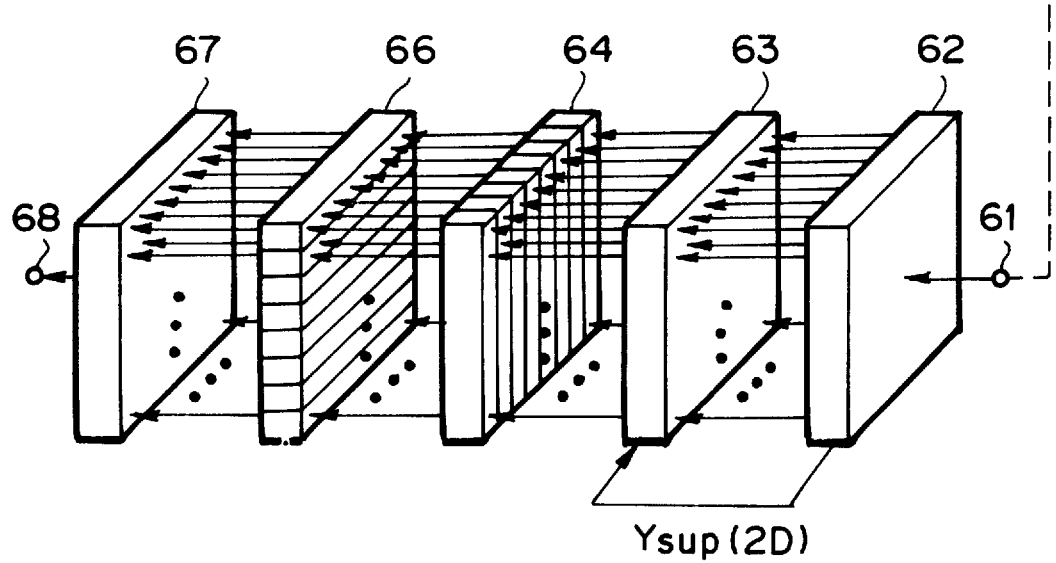

F I G. 13A

SIXTH LEAST SIGNIFICANT BITS (63 BITS)

| | | | | | | | |
|---|---|---|---|---|---|---|---|
| y(0,0)[6] | y(1,0)[6] | y(2,0)[6] | y(3,0)[6] | y(4,0)[6] | y(5,0)[6] | y(6,0)[6] | y(7,0)[6] |
| y(0,1)[6] | y(1,1)[6] | y(2,1)[6] | y(3,1)[6] | y(4,1)[6] | y(5,1)[6] | y(6,1)[6] | y(7,1)[6] |
| y(0,2)[6] | y(1,2)[6] | y(2,2)[6] | y(3,2)[6] | y(4,2)[6] | y(5,2)[6] | y(6,2)[6] | y(7,2)[6] |
| y(0,3)[6] | y(1,3)[6] | y(2,3)[6] | y(3,3)[6] | y(4,3)[6] | y(5,3)[6] | y(6,3)[6] | y(7,3)[6] |
| y(0,4)[6] | y(1,4)[6] | y(2,4)[6] | y(3,4)[6] | y(4,4)[6] | y(5,4)[6] | y(6,4)[6] | y(7,4)[6] |
| y(0,5)[6] | y(1,5)[6] | y(2,5)[6] | y(3,5)[6] | y(4,5)[6] | y(5,5)[6] | y(6,5)[6] | y(7,5)[6] |
| y(0,6)[6] | y(1,6)[6] | y(2,6)[6] | y(3,6)[6] | y(4,6)[6] | y(5,6)[6] | y(6,6)[6] | y(7,6)[6] |
| y(0,7)[6] | y(1,7)[6] | y(2,7)[6] | y(3,7)[6] | y(4,7)[6] | y(5,7)[6] | y(6,7)[6] | |

F I G. 13B

FIFTH LEAST SIGNIFICANT BITS (57 BITS)

| | | | | | | | |
|---|---|---|---|---|---|---|---|
| y(0,0)[5] | y(1,0)[5] | y(2,0)[5] | y(3,0)[5] | y(4,0)[5] | y(5,0)[5] | y(6,0)[5] | y(7,0)[5] |
| y(0,1)[5] | y(1,1)[5] | y(2,1)[5] | y(3,1)[5] | y(4,1)[5] | y(5,1)[5] | y(6,1)[5] | y(7,1)[5] |
| y(0,2)[5] | y(1,2)[5] | y(2,2)[5] | y(3,2)[5] | y(4,2)[5] | y(5,2)[5] | y(6,2)[5] | y(7,2)[5] |
| y(0,3)[5] | y(1,3)[5] | y(2,3)[5] | y(3,3)[5] | y(4,3)[5] | y(5,3)[5] | y(6,3)[5] | |
| y(0,4)[5] | y(1,4)[5] | y(2,4)[5] | y(3,4)[5] | y(4,4)[5] | y(5,4)[5] | y(6,4)[5] | y(7,4)[5] |
| y(0,5)[5] | y(1,5)[5] | y(2,5)[5] | y(3,5)[5] | y(4,5)[5] | y(5,5)[5] | y(6,5)[5] | |
| y(0,6)[5] | y(1,6)[5] | y(2,6)[5] | y(3,6)[5] | y(4,6)[5] | y(5,6)[5] | y(6,6)[5] | |
| y(0,7)[5] | y(1,7)[5] | y(2,7)[5] | | y(4,7)[5] | | | |

F I G. 13C

FOURTH LEAST SIGNIFICANT BITS (42 BITS)

| | | | | | | | |
|---|---|---|---|---|---|---|---|
| y(0,0)[4] | y(1,0)[4] | y(2,0)[4] | y(3,0)[4] | y(4,0)[4] | y(5,0)[4] | y(6,0)[4] | y(7,0)[4] |
| y(0,1)[4] | y(1,1)[4] | y(2,1)[4] | y(3,1)[4] | y(4,1)[4] | y(5,1)[4] | y(6,1)[4] | |
| y(0,2)[4] | y(1,2)[4] | y(2,2)[4] | y(3,2)[4] | y(4,2)[4] | y(5,2)[4] | y(6,2)[4] | |
| y(0,3)[4] | y(1,3)[4] | y(2,3)[4] | | y(4,3)[4] | | | |
| y(0,4)[4] | y(1,4)[4] | y(2,4)[4] | y(3,4)[4] | y(4,4)[4] | y(5,4)[4] | y(6,4)[4] | |
| y(0,5)[4] | y(1,5)[4] | y(2,5)[4] | | y(4,5)[4] | | | |
| y(0,6)[4] | y(1,6)[4] | y(2,6)[4] | | y(4,6)[4] | | | |
| y(0,7)[4] | | | | | | | |

F I G. 13D

THIRD LEAST SIGNIFICANT BITS (22 BITS)

```
y(0,0)[3]  y(1,0)[3]  y(2,0)[3]  y(3,0)[3]  y(4,0)[3]  y(5,0)[3]  y(6,0)[3]
y(0,1)[3]  y(1,1)[3]  y(2,1)[3]             y(4,1)[3]
y(0,2)[3]  y(1,2)[3]  y(2,2)[3]             y(4,2)[3]
y(0,3)[3]
y(0,4)[3]  y(1,4)[3]  y(2,4)[3]             y(4,4)[3]
y(0,5)[3]
y(0,6)[3]
```

F I G. 13E

SECOND LEAST SIGNIFICANT BITS (7 BITS)

```
y(0,0)[2]  y(1,0)[2]  y(2,0)[2]             y(4,0)[2]
y(0,1)[2]
y(0,2)[2]

y(0,4)[2]
```

F I G. 13F

LEAST SIGNIFICANT BIT (1 BIT)

```
y(0,0)[1]
```

F I G. 14A

| y(0,0)[6] | y(1,0)[6] | y(2,0)[6] | y(3,0)[6] | y(4,0)[6] | y(5,0)[6] | y(6,0)[6] | y(7,0)[6] |
|---|---|---|---|---|---|---|---|
| y(0,1)[6] | y(1,1)[6] | y(2,1)[6] | y(3,1)[6] | y(4,1)[6] | y(5,1)[6] | y(6,1)[6] | y(7,1)[6] |
| y(0,2)[6] | y(1,2)[6] | y(2,2)[6] | y(3,2)[6] | y(4,2)[6] | y(5,2)[6] | y(6,2)[6] | y(7,2)[6] |
| y(0,3)[6] | y(1,3)[6] | y(2,3)[6] | y(3,3)[6] | y(4,3)[6] | y(5,3)[6] | y(6,3)[6] | y(7,3)[6] |
| y(0,4)[6] | y(1,4)[6] | y(2,4)[6] | y(3,4)[6] | y(4,4)[6] | y(5,4)[6] | y(6,4)[6] | y(7,4)[6] |
| y(0,5)[6] | y(1,5)[6] | y(2,5)[6] | y(3,5)[6] | y(4,5)[6] | y(5,5)[6] | y(6,5)[6] | y(7,5)[6] |
| y(0,6)[6] | y(1,6)[6] | y(2,6)[6] | y(3,6)[6] | y(4,6)[6] | y(5,6)[6] | y(6,6)[6] | y(7,6)[6] |
| y(0,7)[6] | y(1,7)[6] | y(2,7)[6] | y(3,7)[6] | y(4,7)[6] | y(5,7)[6] | y(6,7)[6] | y(0,0)[3] |

F I G. 14B

| y(0,0)[5] | y(1,0)[5] | y(2,0)[5] | y(3,0)[5] | y(4,0)[5] | y(5,0)[5] | y(6,0)[5] | y(7,0)[5] |
|---|---|---|---|---|---|---|---|
| y(0,1)[5] | y(1,1)[5] | y(2,1)[5] | y(3,1)[5] | y(4,1)[5] | y(5,1)[5] | y(6,1)[5] | y(7,1)[5] |
| y(0,2)[5] | y(1,2)[5] | y(2,2)[5] | y(3,2)[5] | y(4,2)[5] | y(5,2)[5] | y(6,2)[5] | y(7,2)[5] |
| y(0,3)[5] | y(1,3)[5] | y(2,3)[5] | y(3,3)[5] | y(4,3)[5] | y(5,3)[5] | y(6,3)[5] | y(0,4)[3] |
| y(0,4)[5] | y(1,4)[5] | y(2,4)[5] | y(3,4)[5] | y(4,4)[5] | y(5,4)[5] | y(6,4)[5] | y(7,4)[5] |
| y(0,5)[5] | y(1,5)[5] | y(2,5)[5] | y(3,5)[5] | y(4,5)[5] | y(5,5)[5] | y(6,5)[5] | y(0,2)[3] |
| y(0,6)[5] | y(1,6)[5] | y(2,6)[5] | y(3,6)[5] | y(4,6)[5] | y(5,6)[5] | y(6,6)[5] | y(0,1)[3] |
| y(0,7)[5] | y(1,7)[5] | y(2,7)[5] | y(4,0)[3] | y(4,7)[5] | y(2,0)[3] | y(1,0)[3] | y(0,0)[2] |

F I G. 14C

| y(0,0)[4] | y(1,0)[4] | y(2,0)[4] | y(3,0)[4] | y(4,0)[4] | y(5,0)[4] | y(6,0)[4] | y(7,0)[4] |
|---|---|---|---|---|---|---|---|
| y(0,1)[4] | y(1,1)[4] | y(2,1)[4] | y(3,1)[4] | y(4,1)[4] | y(5,1)[4] | y(6,1)[4] | y(0,6)[3] |
| y(0,2)[4] | y(1,2)[4] | y(2,2)[4] | y(3,2)[4] | y(4,2)[4] | y(5,2)[4] | y(6,2)[4] | y(0,5)[3] |
| y(0,3)[4] | y(1,3)[4] | y(2,3)[4] | y(4,4)[3] | y(4,3)[4] | y(2,4)[3] | y(1,4)[3] | y(0,4)[2] |
| y(0,4)[4] | y(1,4)[4] | y(2,4)[4] | y(3,4)[4] | y(4,4)[4] | y(5,4)[4] | y(6,4)[4] | y(0,3)[3] |
| y(0,5)[4] | y(1,5)[4] | y(2,5)[4] | y(4,2)[3] | y(4,5)[4] | y(2,2)[3] | y(1,2)[3] | y(0,2)[2] |
| y(0,6)[4] | y(1,6)[4] | y(2,6)[4] | y(4,1)[3] | y(4,6)[4] | y(2,1)[3] | y(1,1)[3] | y(0,1)[2] |
| y(0,7)[4] | y(6,0)[3] | y(5,0)[3] | y(4,0)[2] | y(3,0)[3] | y(2,0)[2] | y(1,0)[2] | y(0,0)[1] |

FIG. 17

( THIRD LEAST SIGNIFICANT BITS )

↓

77

INPUT:
y(0,0)[3]  y(1,0)[3]  y(2,0)[3]  y(3,0)[3]  y(4,0)[3]  y(5,0)[3]  y(6,0)[3]
y(0,1)[3]  y(1,1)[3]  y(2,1)[3]             y(4,1)[3]
y(0,2)[3]  y(1,2)[3]  y(2,2)[3]             y(4,2)[3]
y(0,3)[3]
y(0,4)[3]  y(1,4)[3]  y(2,4)[3]             y(4,4)[3]
y(0,5)[3]
y(0,6)[3]

↓

78

CALCULATION OF:
y(3,1)[3], y(5,1)[3], y(6,1)[3], y(3,2)[3], y(5,2)[3], y(6,2)[3],
y(3,4)[3], y(5,4)[3], y(6,4)[3]

$y(k6,s)[3] = y(0,0)[3] \wedge y(k4,0)[3] \wedge y(k5,0)[3] \wedge y(k6,0)[3]$
$\wedge y(0,s)[3] \wedge y(k4,s)[3] \wedge y(k5,s)[3]$
$s = 1, 2, 4 ; (k4, k5, k6) = (1,2,3), (1,4,5), (2,4,6)$

↓

79

CALCULATION OF:
y(1,3)[3], y(2,3)[3], ..., y(6,3)[3], y(1,5)[3], y(2,5)[3], ..., y(6,5)[3],
y(1,6)[3], y(2,6)[3], ..., y(6,6)[3]

$y(r,k6)[3] = y(0,0)[3] \wedge y(r,k4)[3] \wedge y(r,k5)[3] \wedge y(r,k6)[3]$
$\wedge y(r,0)[3] \wedge y(r,k4)[3] \wedge y(r,k5)[3]$
$r = 1, 2, ..., 6 ; (k4, k5, k6) = (1,2,3), (1,4,5), (2,4,6)$

↓

80

CALCULATION OF: y(7,0)[3], y(7,1)[3], ..., y(7,6)[3]

$y(7,s)[3] = y(0,s)[3] \wedge y(1,s)[3] \wedge ... \wedge y(6,s)[3]$
$s = 0, 1, ..., 6$

↓

81

CALCULATION OF: y(0,7)[3], y(1,7)[3], ..., y(7,7)[3]

$y(r,7)[3] = y(r,0)[3] \wedge y(r,1)[3] \wedge ... \wedge y(r,6)[3]$
$r = 0, 1, ..., 7$

↓

( END )

FIG. 18

( FOURTH LEAST SIGNIFICANT BITS )

↓

82

INPUT : TRANSFORM COEFFICIENTS WHOSE THIRD LEAST SIGNIFICANT BITS ARE SUPPLEMENTED, AND y(0,0)[4] y(1,0)[4] y(2,0)[4] y(3,0)[4] y(4,0)[4] y(5,0)[4] y(6,0)[4] y(7,0)[4]
y(0,1)[4] y(1,1)[4] y(2,1)[4] y(3,1)[4] y(4,1)[4] y(5,1)[4] y(6,1)[4]
y(0,2)[4] y(1,2)[4] y(2,2)[4] y(3,2)[4] y(4,2)[4] y(5,2)[4] y(6,2)[4]
y(0,3)[4] y(1,3)[4] y(2,3)[4]           y(4,3)[4]
y(0,4)[4] y(1,4)[4] y(2,4)[4] y(3,4)[4] y(4,4)[4] y(5,4)[4] y(6,4)[4]
y(0,5)[4] y(1,5)[4] y(2,5)[4]           y(4,5)[4]
y(0,6)[4] y(1,6)[4] y(2,6)[4]           y(4,6)[4]
y(0,7)[4]

↓

83

DISPOSE INPUT 42 BITS AT FOURTH LEAST SIGNIFICANT BITS OF TRANSFORM COEFFICIENTS WHOSE THIRD LEAST SIGNIFICANT BITS ARE SUPPLEMENTED. UNDETERMINED BITS ARE SET TO ZERO.

↓

84

CALCULATION OF : y(3,3)[4], y(5,3)[4], y(6,3)[4], y(3,5)[4], y(5,5)[4], y(6,5)[4], y(3,6)[4], y(5,6)[4], y(6,6)[4]

$$y(k6,k9)[4] = f[4]\{ y(0,0) + y(k4,0) + y(k5,0) + y(k6,0)$$
$$+ y(0,k7) + y(k4,k7) + y(k5,k7) + y(k6,k7)$$
$$+ y(0,k8) + y(k4,k8) + y(k5,k8) + y(k6,k8)$$
$$+ y(0,k9) + y(k4,k9) + y(k5,k9) + y(k5,k9) \}$$

$(k4, k5, k6), (k7, k8, k9) = (1,2,3), (1,4,5), (2,4,6)$

↓

85

CALCULATION OF : y(7,1)[4], y(7,2)[4], ..., y(7,6)[4]

$$y(7,s)[4] = f[4]\{ y(0,0) + y(1,0) + ... + y(7,0)$$
$$+ y(0,s) + y(1,s) + ... + y(7,s) \}$$

$s = 1, 2, ..., 6$

↓

86

CALCULATION OF : y(1,7)[4], y(2,7)[4], ..., y(7,7)[4]

$$y(r,7)[4] = f[4]\{ y(0,0) + y(1,0) + ... + y(7,0)$$
$$+ y(r,0) + y(r,1) + ... + y(r,7) \}$$

$r = 1, 2, ..., 7$

↓

( END )

FIG. 19

( FIFTH LEAST SIGNIFICANT BITS )

↓

87

INPUT: TRANSFORM COEFFICIENTS WHOSE THIRD AND FOURTH LEAST SIGNIFICANT BITS ARE SUPPLEMENTED, AND y(0,0)[5]  y(1,0)[5]  y(2,0)[5]  y(3,0)[5]  y(4,0)[5]  y(5,0)[5]  y(6,0)[5]  y(7,0)[5]
y(0,1)[5]  y(1,1)[5]  y(2,1)[5]  y(3,1)[5]  y(4,1)[5]  y(5,1)[5]  y(6,1)[5]  y(7,1)[5]
y(0,2)[5]  y(1,2)[5]  y(2,2)[5]  y(3,2)[5]  y(4,2)[5]  y(5,2)[5]  y(6,2)[5]  y(7,2)[5]
y(0,3)[5]  y(1,3)[5]  y(2,3)[5]  y(3,3)[5]  y(4,3)[5]  y(5,3)[5]  y(6,3)[5]
y(0,4)[5]  y(1,4)[5]  y(2,4)[5]  y(3,4)[5]  y(4,4)[5]  y(5,4)[5]  y(6,4)[5]  y(7,4)[5]
y(0,5)[5]  y(1,5)[5]  y(2,5)[5]  y(3,5)[5]  y(4,5)[5]  y(5,5)[5]  y(6,5)[5]
y(0,6)[5]  y(1,6)[5]  y(2,6)[5]  y(3,6)[5]  y(4,6)[5]  y(5,6)[5]  y(6,6)[5]
y(0,7)[5]  y(1,7)[5]  y(2,7)[5]             y(4,7)[5]

↓

88

DISPOSE INPUT 57 BITS AT FIFTH LEAST SIGNIFICANT BITS OF TRANSFORM COEFFICIENTS WHOSE THIRD AND FOURTH LEAST SIGNIFICANT BITS ARE SUPPLEMENTED. UNDETERMINED BITS ARE SET TO ZERO.

↓

89

CALCULATION OF $y(7,3)[5], y(7,5)[5], y(7,6)[5]$ $y(7,k6)[5] = f[5]\{ y(0,0) + y(1,0) + ... + y(7,0)$
$\qquad\qquad\qquad + y(0,k4) + y(1,k4) + ... + y(7,k4)$
$\qquad\qquad\qquad + y(0,k5) + y(1,k5) + ... + y(7,k5)$
$\qquad\qquad\qquad + y(0,k6) + y(1,k6) + ... + y(7,k6) \}$ $(k4, k5, k6) = (1,2,3), (1,4,5), (2,4,6)$

↓

90

CALCULATION OF $y(3,7)[5], y(5,7)[5], y(7,6)[5], y(7,7)[5]$ $y(k3,7)[5] = f[5]\{ y(k0,0) + y(k0,1) + ... + y(k0,7)$
$\qquad\qquad\qquad + y(k1,0) + y(k1,0) + ... + y(k1,7)$
$\qquad\qquad\qquad + y(k2,0) + y(k2,0) + ... + y(k2,7)$
$\qquad\qquad\qquad + y(k3,0) + y(k3,0) + ... + y(k3,7) \}$ $(k0, k1, k2, k3) = (0,1,2,3), (0,1,4,5), (0,2,4,6), (1,2,4,7)$

↓

( END )

HADAMARD TRANSFORM CODING/DECODING METHOD AND APPARATUS FOR IMAGE SIGNALS

BACKGROUND OF THE INVENTION

1. Field of the Present Invention

The present invention relates to a reversible coding/decoding method and apparatus for image signals, and particularly to an Hadamard transform coding/decoding method and apparatus for image signals using an eight-order Hadamard transform.

2. Description of the Related Art

The Hadamard transform for image signals has been widely known, and its detailed description is made in "DIGITAL SIGNAL PROCESSING OF IMAGES— enlarged edition—" by Takahiko Fukinuki, pp181–193 (issued on Jan. 27, 1992 by Nikkan Kogyo Shinbunsha), "MULTIDIMENSIONAL SIGNAL PROCESSING OF TV SIGNALS" by Takahiko Fukinuki, pp247–250 (issued on Nov. 15, 1988, first edition by Nikkan Kogyo Shinbunsha), and "Intraframe image coding by cascaded Hadamard transforms", by T. Fukinuki, M. Miyata, IEEE Trans. Communications, page 175 to 180, Vol. Com-21, No. 3 (March 1973).

Representing picture element values of eight points by $x(0), x(1), \ldots, x(7)$, the transform coefficients $y(0), y(1), \ldots, y(7)$ of eighth-order Hadamard transform are calculated according to the following equation 1 (Hadamard transform), and further the eighth-order Hadamard inverse-transform of the equation 1 is expressed by the following equation 2 (Hadamard inverse transform):

$$\begin{bmatrix} y(0) \\ y(1) \\ \vdots \\ y(7) \end{bmatrix} = (1/8)^{1/2} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} x(0) \\ x(1) \\ \vdots \\ x(7) \end{bmatrix}$$

[Equation 1]

$$\begin{bmatrix} x(0) \\ x(1) \\ \vdots \\ x(7) \end{bmatrix} = (1/8)^{1/2} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} y(0) \\ y(1) \\ \vdots \\ y(7) \end{bmatrix}$$

[Equation 2]

The definition equation of the Hadamard transform may differ from the equations 1 and 2 in a treatment manner of normalization factors or the corresponding order of transform coefficients, however, there is no variation in basic processing in which the transform coefficients are calculated from picture element values through addition and subtraction calculations. In the eighth-order Hadamard transform, when an input is represented with 8 bits for one picture element, the transform coefficient of an output is represented with 11 bits. In order to perform a reversible coding, all of 11 bits of the transform coefficient are required, and thus all of the bit information must be recorded or transmitted in the prior art. On the other hand, it has been known that the transform coefficients of the Hadamard transform have a correlation with one another in bit pattern.

In the conventional Hadamard transform coding/decoding method of image signals, the transform coefficients of the Hadamard transform have a bit-pattern correlation with one another as described above, however, the above correlation has not been used in a coding/decoding method. That is, it is redundant to record/transmit all the bit information, however, the actually-used coding/decoding method does not take into consideration this redundancy. Therefore, an extra memory for storing the transform coefficients or an extra line capacity for transmitting the transform coefficients must be provided in the conventional coding/decoding method.

The redundancy of the bit pattern of the transform coefficients $y(0)$ to $y(7)$ of the eighth-order Hadamard will now be described. First, the least significant bits of the transform coefficients $y(0)$ to $y(7)$ are identical to one another over all the transform coefficients $y(0)$ to $y(7)$. That is, for the least significant bits of the transform coefficients $y(0)$ to $y(7)$, it is sufficient to record/transmit only one bit for all the eight transform coefficients $y(0)$ to $y(7)$.

For the second least significant bits of the transform coefficients $y(0)$ to $y(7)$, if the second least significant bits of suitably selected four transform coefficients are known, the second least significant bits of the residual four transform coefficients can be specified. For example, if $y(0)[2]$, $y(1)[2]$, $y(2)[2]$ and $y(4)[2]$ are known (here, $y(r)[m]$ represents the m-th least significant bit of an r-th order transform coefficient; r represents an integer from 0 to 7, and m represents an integer from 1 to 8), $y(3)[2]$, $y(5)[2]$, $y(6)[2]$ and $y(7)[2]$ can be calculated from the above four second least significant bits according to the following equation:

$$y(k3)[2]=y(k0)[2] \wedge y(k1)[2] \wedge y(k2)[2];$$

$$(k0,k1,k2,k3)=(0,1,2,3),\ (0,1,4,5),\ (0,2,4,6),\ (1,2,4,7)$$

Here, [$\wedge$] expresses an exclusive OR operation.

With respect to the third least significant bits of the transform coefficients, if the third least significant bits of seven transform coefficients are known, the third significant bit of the residual transform coefficient can be specified. For example, if $y(0)[3], y(1)[3], \ldots, y(6)[3]$ are known, $y(7)[3]$ can be calculated on the basis of the following equation:

$$y(7)[3]=y(0)[3] \wedge y(1)[3] \wedge y(2)[3] \wedge y(3)[3] \wedge y(4)[3]$$
$$\wedge y(5)[3] \wedge y(6)[3]$$

As described above, the bit pattern of the first, second and third least significant bits of the transform coefficients $y(0)$ to $y(7)$ has a correlation in each block. According to the correlation, 12 bits of the first, second and third least significant bits (totally, 3×8=24 bits) of the eight transform coefficients $y(0)$ to $y(7)$ can be obtained from the residual 12 bits, and thus these transform coefficients are proved to be redundant.

The same is satisfied for a vertical and lateral separation type of two-dimensional (8×8)th-order Hadamard transform. First, the least significant bits of all the transform coefficients are identical to one another. Accordingly, for the least significant bits, only one bit may be recorded/transmitted for all the transform coefficients of (8×8) matrix.

With respect to bits from the second least significant bits to the sixth least significant bits of the transform coefficients, representing an m-th least significant bit of a (r,s)th-order transform coefficient by y(r,s)[m], the following equation is satisfied (s represents an integer of 0 to 7):

$y(r, k3)[2] = y(r, k0)[2] \char`\^ y(r, k1)[2] \char`\^ y(r, k2)[2]; r = 0, 1, \ldots, 7;$ $(k0, k1, k2, k3) = (0, 1, 2, 3), (0, 1, 4, 5), (0, 2, 4, 6), (1, 2, 4, 7)$ $y(k3, s)[2] = y(k0, s)[2] \char`\^ y(k1, s)[2] \char`\^ y(k2, s)[2]; s = 0, 1, \ldots, 7;$ $(k0, k1, k2, k3) = (0, 1, 2, 3), (0, 1, 4, 5), (0, 2, 4, 6), (1, 2, 4, 7)$ $y(r, s)[2] = y(0, 0)[2] \char`\^ y(r, 0)[2] \char`\^ y(0, s)[2]; r, s = 0, 1, \ldots, 7$ $y(r, 7)[3] = y(r, 0)[3] \char`\^ y(r, 1)[3] \char`\^ \ldots \char`\^ y(r, 6)[3]; r = 0, 1, \ldots, 7$ $y(7, s)[3] = y(0, s)[3] \char`\^ y(1, s)[3] \char`\^ \ldots \char`\^ y(6, s)[3]; s = 0, 1, \ldots, 7$ $y(r, k3)[3] =$ $\quad y(0, k0)[3] \char`\^ y(0, k1)[3] \char`\^ y(0, k2)[3] \char`\^ y(0, k3)[3] \char`\^ y(r, k0)[3] \char`\^$ $\quad y(r, k1)[3] \char`\^ y(r, k2)[3]; r = 0, 1, \ldots, 7; (k0, k1, k2, k3) =$ $\quad (0, 1, 2, 3), (0, 1, 4, 5), (0, 2, 4, 6), (1, 2, 4, 7)$ $y(k3, s)[3] = y(k0, 0)[3] \char`\^ y(k1, 0)[3] \char`\^ y(k2, 0)[3] \char`\^ y(k3, 0)[3] \char`\^$ $\quad y(k0, s)[3] \char`\^ y(k1, s)[3] \char`\^ y(k2, s)[3]; s = 0, 1, \ldots, 7;$ $\quad (k0, k1, k2, k3) = (0, 1, 2, 3), (0, 1, 4, 5), (0, 2, 4, 6), (1, 2, 4, 7)$ $y(0, 0) + y(0, 1) + \ldots + y(0, 7) + y(r, 0) + y(r, 1) + \ldots +$ $\quad y(r, 7) = 16n; r = 0, 1, \ldots, 7; n \text{ represents an integer}$ $y(0, 0) + y(1, 0) + \ldots + y(7, 0) + y(0, s) + y(1, s) + \ldots +$ $\quad y(7, s) = 16n; s = 0, 1, \ldots, 7; n \text{ represents an integer}$ $y(k0, k4) + y(k1, k4) + y(k2, k4) + y(k3, k4) + y(k0, k5) +$ $\quad y(k1, k5) + y(k2, k5) + y(k3, k5) + y(k0, k6) + y(k1, k6) +$ $\quad y(k2, k6) + y(k3, k6) + y(k0, k7) + y(k1, k7) + y(k2, k7) +$ $\quad y(k3, k7) = 16n; (k0, k1, k2, k3), (k4, k5, k6, k7) = (0, 1, 2, 3),$ $\quad (0, 1, 4, 5), (0, 2, 4, 6), (1, 2, 4, 7); n \text{ represents an integer}$ $y(k0, 0) + y(k0, 1) + \ldots + y(k0, 7) + y(k1, 0) + y(k1, 1) + \ldots +$ $\quad y(k1, 7) + y(k2, 0) + y(k2, 1) + \ldots + y(k2, 7) + y(k3, 0) +$ $\quad y(k3, 1) + \ldots + y(k3, 7) = 32n; (k0, k1, k2, k3) = (0, 1, 2, 3),$ $\quad (0, 1, 4, 5), (0, 2, 4, 6), (1, 2, 4, 7); n \text{ represents an integer}$ $y(0, k0) + y(1, k0) + \ldots + y(7, k0) + y(0, k1) + y(1, k1) + \ldots +$ $\quad y(7, k1) + y(0, k2) + y(1, k2) + \ldots + y(7, k2) + y(0, k3) +$ $\quad y(1, k3) + \ldots + y(7, k3) = 32n; (k0, k1, k2, k3) = (0, 1, 2, 3),$ $\quad (0, 1, 4, 5), (0, 2, 4, 6), (1, 2, 4, 7); n \text{ represents an integer.}$ $y(0, 0) + y(0, 1) + \ldots + y(0, 7) + (1, 0) + y(1, 1) + \ldots +$ $\quad y(1, 7) + y(2, 0) + y(2, 1) + \ldots + y(2, 7) + y(3, 0) + y(3, 1) + \ldots +$ $\quad y(3, 7) + y(4, 0) + y(4, 1) + \ldots + y(4, 7) + y(5, 0) + y(5, 1) + \ldots +$ -continued $y(5, 7) + y(6, 0) + y(6, 1) + \ldots + y(6, 7) + y(7, 0) + y(7, 1) + \ldots +$ $\quad y(7, 7) = 64n; n \text{ represents an integer}$ Accordingly, if bit patterns of suitably selected 7, 22, 42, 57 and 63 transform coefficients are known for bits of the second least significant bits to the sixth least significant bits respectively, the bit patterns of the residual transform coefficients can be specified. That is, 192 bits of the least significant bits to the sixth least significant bits (totally, 384 bits) of the transform coefficients y(0,0) to y(7,7) of the vertical and lateral separation type of two-dimensional (8×8) th-order Hadamard transform are proved to be redundant.

SUMMARY OF THE INVENTION

A first object of the present invention is to provide a one-dimensional Hadamard transform coding/decoding method for image signals in which a coding amount of transform coefficients is reduced by using a bit pattern correlation of transform coefficients of one-dimensional eighth-order Hadamard transform.

A second object of the present invention is to provide a one-dimensional Hadamard transform coding apparatus which achieves the one-dimensional Hadamard transform coding/decoding method for image signals.

A third object of the present invention is to provide a one-dimensional Hadamard transform decoding apparatus which achieves the one-dimensional Hadamard transform coding/decoding method for image signals.

A fourth object of the present invention is to provide a two-dimensional Hadamard transform coding/decoding method in which a coding amount of transform coefficients is reduced by using a bit pattern correlation of transform coefficients of a two-dimensional (8×8)th-order Hadamard transform.

A fifth object of the present invention is to provide a two-dimensional Hadamard transform coding apparatus which achieves the two-dimensional Hadamard transform coding/decoding method for image signals.

A sixth object of the present invention is to provide a two-dimensional Hadamard transform decoding apparatus which achieves the two-dimensional Hadamard transform coding/decoding method for image signals.

A seventh object of the present invention is to provide a two-dimensional Hadamard transform coding/decoding method for image signals in which a coding amount of transform coefficients is reduced by using a bit pattern correlation of transform coefficients of two-dimensional (8×8)th-order Hadamard transform, and a transform processing direction of the Hadamard transform can be independently set at each of a coding side and a decoding side.

An eighth object of the present invention is to provide a two-dimensional Hadamard transform coding apparatus which achieves the two-dimensional Hadamard transform coding/decoding method for image signals as described above.

A ninth object of the present invention is to provide a two-dimensional Hadamard transform decoding apparatus which achieves the two-dimensional Hadamard transform coding/decoding method for image signals as described above.

In order to attain the above objects, according to a first aspect of the present invention, a one-dimensional Hadamard transform coding/decoding method for image signals comprises a blocking step of blocking an input image signal every 8 picture elements, an Hadamard transform step for performing an eighth-order Hadamard transform on picture element values which are blocked in the blocking step to obtain transform coefficients, a bit delete step for extracting, from predetermined positions in each block, 1 bit, 4 bits and 7 bits from the least significant bits, the second least significant bits and the third least significant bits respectively for the transform coefficients obtained in the Hadamard transform step to output the extracted bits as supplement information, and outputting the transform coefficients from which the least significant bits, the second least significant bits and the third least significant bits are deleted, a record/transmit(output) step for recording or transmitting the supplement information and the transform coefficients from which the first, second and third least significant bits are deleted in the bit delete step, a reproduction/reception (input) step for reproducing or receiving the recorded or transmitted transform coefficients and the supplement information, a bit supplement step for supplementing: according to the supplement information reproduced or received in the reproduction/reception step, the least significant bits of all the transform coefficients on the basis of information of 1 bit per block which represents the least significant bits of the transform coefficients; the second least significant bits of all the transform coefficients on the basis of information of 4 bits per block which represents the second significant bits of the transform coefficients; and the third least significant bits of all the transform coefficients on the basis of information of 7 bits per block which represents the third significant bits of the transform coefficients, an Hadamard inverse-transform step for performing an eighth-order Hadamard inverse-transform on the transform coefficients whose first, second and third least significant bits are supplemented in the bit supplement step, thereby obtaining picture element values, and an image signal output step for arranging the picture element values obtained in the Hadamard inverse-transform step into eight picture elements and outputting the arranged eight picture elements as an image signal.

According to a second aspect of the present invention, a one-dimensional Hadamard transform coding apparatus for image signals comprises blocking means for blocking an input image signal every 8 picture elements, Hadamard transform means for performing an eighth-order Hadamard transform on the picture elements blocked by the blocking means to obtain transform coefficients, bit delete means for extracting, from predetermined positions in each block, 1 bit, 4 bits and 7 bits from the least significant bits, the second least significant bits and the third least significant bits respectively for the transform coefficients obtained by the Hadamard transform means to output the extracted bits as supplement information, and outputting the transform coefficients from which the least significant bits, the second least significant bits and the third least significant bits are deleted, and record/transmit(output) means for recording or transmitting the transform coefficients and the supplement information output from the bit delete means.

According to a third aspect of the present invention, a one-dimensional Hadamard transform decoding apparatus for image signals comprises reproduction/reception(input) means for reproducing or receiving the recorded or transmitted transform coefficients and the supplement information, bit supplement means for supplementing: the least significant bits of all the transform coefficients on the basis of information of 1 bit per block which is a part of the supplement information and represents the least significant bits of the transform coefficients; the second least significant bits of all the transform coefficients on the basis of information of 4 bits per block which is a part of the supplement information and represents the second least significant bits of the transform coefficients; and the third least significant bits of all the transform coefficients on the basis of information of 7 bits per block which is a part of the supplement information and represents the third least significant bits of the transform coefficients, Hadamard inverse-transform means for performing an eighth-order Hadamard inverse-transform on the transform coefficients whose first, second and third least significant bits are supplemented in the bit supplement means, thereby obtaining picture element values, and image signal output means for arranging the picture element values obtained in the Hadamard inverse-transform means into eight picture elements and outputting the arranged eight picture elements as an image signal.

According to a fourth aspect of the present invention, a two-dimensional Hadamard transform coding/decoding method comprises a blocking step for blocking an input image signal every 8 picture elements×8 lines, a first Hadamard transform step for grouping the picture element values blocked in the blocking step into eight groups in any one of a column direction and a line direction and performing an eighth-order Hadamard transform on the picture element values of each group to obtain a first transform coefficient group, a first bit delete step for reducing: for the first transform coefficient group obtained in the first Hadamard transform step, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and outputting a second transform coefficient group from which the first, second and third least significant bits are deleted, a second Hadamard transform step for rearranging transform coefficients representing the same frequency component in each block to obtain new eight groups for the second transform coefficient group output in the first bit delete step, and performing an eighth-order Hadamard transform on transform coefficients belonging to each of the new groups to obtain a third transform coefficient group, a second bit delete step for reducing: for the third transform coefficient group obtained in the second Hadamard transform step, the least significant bits of the transform coefficients to 1 bit per group; the second least significant bits of the transform coefficients to 4 bits per group; and the third least significant bits of the transform coefficients to 7 bits per group to output totally 96 bits per block as second supplement information, and outputting a fourth transform coefficient group from which the first, second and third least significant bits are deleted, a recording/transmitting(outputting) step for recording or transmitting the fourth transform coefficient group output in the second bit delete step, the first supplement information and the second supplement information, a reproducing/receiving(inputting) step for reproducing or receiving the recorded or transmitted fourth transform coefficient group, the first supplement information and the second supplement information, a first bit supplement step for grouping the fourth transform coefficient group in accordance with the second supplement information obtained in the reproducing/receiving(inputting) step and then supplementing: the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients to thereby restore the third transform coefficient group, a first Hadamard inverse-transform step for performing an eighth-order Hadamard inverse-transform on the third transform coefficient group restored in the first bit supplement step every group to obtain the second transform coefficient group, a second bit supplement step for rearranging, for the second transform coefficient group obtained in the first Hadamard inverse-transform step, transform coefficients located at the same position in the group every block to obtain new eight groups, and supplementing: for the transform coefficients of each group thus obtained, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients in accordance with the first supplement information obtained in the reproducing/receiving step to thereby restore the first transform coefficient group, a second Hadamard inverse-transform step for performing an eighth-order Hadamard inverse-transform on the first transform coefficient group restored in the second bit supplement step every group to obtain picture element values, and an image signal output step for arranging the picture element values obtained in the second Hadamard inverse-transform step in a matrix of 8 picture elements×8 lines and outputting the arranged picture element values as an image signal.

According to a fifth aspect of the present invention, a two-dimensional Hadamard transform coding apparatus comprises blocking means for blocking an input image signal every 8 picture elements×8 lines, first Hadamard transform means for classifying the picture element values blocked by the blocking means into eight groups in any one of a column direction and a line direction and performing an eighth-order Hadamard transform on the picture element values of each group to obtain a first transform coefficient group, first bit delete means for reducing: for the first transform coefficient group obtained by the first Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and outputting a second transform coefficient group from which the first, second and third least significant bits are deleted, second Hadamard transform means for rearranging transform coefficients representing the same frequency component in each block to obtain new eight groups for the second transform coefficient group output in the first bit delete means, and performing an eighth-order Hadamard transform on transform coefficients belonging to each of the new groups to obtain a third transform coefficient group, second bit delete means for reducing: for the third transform coefficient group obtained by the second Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as second supplement information, and outputting a fourth transform coefficient group from which the first, second and third least significant bits are deleted, and recording/transmitting means for recording or transmitting the fourth transform coefficient group output from the second bit delete means, the first supplement information and the second supplement information.

According to a sixth aspect of the present invention, a two-dimensional Hadamard transform decoding apparatus for image signals comprises reproducing/receiving means for reproducing or receiving recorded or transmitted first transform coefficient group and two pairs of supplement information, first bit supplement means for grouping the first transform coefficient group in accordance with one pair of the two pairs of the supplement information into eight groups each containing eight transform coefficients, and then supplementing: every group, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients, first Hadamard inverse-transform means for performing an eighth-order Hadamard inverse-transform on the second transform coefficient group whose first, second and third least significant bits are supplemented by the first bit supplement means, every group when the bit supplement is completed, thereby obtaining a third transform coefficient group, second bit supplement means for grouping the third transform coefficient group obtained by the first Hadamard inverse-transform means into eight groups in accordance with the other pair of the two pairs of the supplement information, and then supplementing; every group, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients, second Hadamard inverse-transform means for performing an eighth-order Hadamard inverse-transform on the fourth transform coefficient group whose first, second and third least significant bits are supplemented by the second bit supplement means, every group when the second bit supplement is completed, thereby obtaining picture element values, and image signal output means for arranging the picture element values obtained in the second Hadamard inverse-transform means in a matrix of 8 picture elements×8 lines and outputting the arranged picture element values as an image signal.

According to a seventh aspect of the present invention, a two-dimensional Hadamard transform coding/decoding method comprises a blocking step for blocking an input image signal every 8 picture elements×8 lines, a two-dimensional Hadamard transform step for performing a vertical and lateral separation type two-dimensional (8×8) th-order Hadamard transform on picture elements of each block blocked by the blocking step which are blocked in the blocking step to obtain a first transform coefficient group, a two-dimensional bit delete step for reducing; for the first transform coefficient group obtained in the two-dimensional Hadamard transform step, the least significant bits of the transform coefficients to 1 bit per block; the second least significant bits of the transform coefficients to 7 bits per block; the third least significant bits of the transform coefficients to 22 bits per block; the fourth least significant bits to 42 bits per block; the fifth least significant bits to 57 bits and the sixth least significant bits to 63 bits per block to output totally 192 bits per block as supplement information, and outputting a second transform coefficient group from which the first to sixth least significant bits are deleted, a recording/transmitting step for recording or transmitting the second transform coefficient group whose first to sixth least significant bits are deleted in the two-dimensional bit delete step and the supplement information, a reproducing/receiving step for reproducing or receiving the recorded or transmitted second transform coefficient group and the supplement information, a two-dimensional bit supplement step for supplementing; for th second transform coefficient group reproduced or received in the reproducing/receiving step and on the basis of the supplement information; the least significant bits of all the transform coefficients on the basis of 1-bit information per block representing the least significant bits of the transform coefficients; the second least significant bits of all the transform coefficients on the basis of 7-bit information per block representing the second least significant bits of the transform coefficients; the third least significant bits of all the transform coefficients on the basis of 22-bit information per block representing the third least significant bits of the transform coefficients; the fourth least significant bits of all the transform coefficients on the basis of 42-bit information per block representing the fourth least significant bits of the transform coefficients and the supplemented third least significant bits; the fifth least significant bits of all the transform coefficients on the basis of 57-bit information per block representing the fifth least significant bits of the transform coefficients and the supplemented third and fourth least significant bits; and the sixth least significant bits of all the transform coefficients on the basis of 63-bit in formation per block representing the sixth least significant bits of the transform coefficients and the supplemented third, fourth and fifth least significant bits, thereby restoring the first transform coefficient group, a two-dimensional Hadamard inverse-transform step for performing a vertical and lateral separation type two-dimensional (8×8)th-order Hadamard inverse-transform on the first transform coefficient group restored in the two-dimensional bit supplement step to obtain picture element values, and an image signal output step for arranging the picture element values obtained in the two-dimensional Hadamard inverse-transform step in a matrix of 8 picture elements×8 lines and outputting the arranged picture element values as an image signal.

According to an eighth aspect of the present invention, a two-dimensional Hadamard transform coding apparatus comprises blocking means for blocking an input image signal every 8 picture elements×8 lines, two-dimensional Hadamard transform means for performing a vertical and lateral separation type two-dimensional (8×8)th-order Hadamard transform on picture elements of each block blocked by the blocking means which are blocked by the blocking means to obtain a first transform coefficient group, two-dimensional bit delete means for extracting: for the first transform coefficient group obtained by the two-dimensional Hadamard transform means, 1 bit from the least significant bits of the transform coefficients; 7 bits from the second least significant bits of the transform coefficients; 22 bits from the third least significant bits of the transform coefficients; 42 bits from the fourth least significant bits; 57 bits from the fifth least significant bits; and 63 bits from the sixth least significant bits from predetermined positions in each block to output the extracted bits as supplement information, and outputting a second transform coefficient group from which the first to sixth least significant bits are deleted, and recording/transmitting means for recording or transmitting the second transform coefficient group whose first to sixth least significant bits are deleted and which are output from the two-dimensional bit delete means and the supplement information.

According to a ninth aspect of the present invention, a two-dimensional Hadamard transform decoding apparatus comprises reproducing/receiving(inputting) means for reproducing or receiving a recorded or transmitted first transform coefficient group and supplement information, two-dimensional bit supplement means for supplementing: for the first transform coefficient group reproduced or received by the reproducing/receiving means; the least significant bits of all the transform coefficients on the basis of 1-bit information per block of the supplement information, which represents the least significant bits of the transform coefficients; the second least significant bits of all the transform coefficients on the basis of 7-bit information per block of the supplement information, which represents the second least significant bits of the transform coefficients; the third least significant bits of all the transform coefficients on the basis of 22-bit information per block of the supplement information, which represents the third least significant bits of the transform coefficients; the fourth least significant bits of all the transform coefficients on the basis of 42-bit information per block of the supplement information, which represents the fourth least significant bits of the transform coefficients, and the supplemented third least significant bits; the fifth least significant bits of all the transform coefficients on the basis of 57-bit information per block of the supplement information, which represents the fifth least significant bits of the transform coefficients, and the supplemented third and fourth least significant bits; and the sixth least significant bits of all the transform coefficients on the basis of 63-bit information per block of the supplement information, which represents the sixth least significant bits of the transform coefficients, and the supplemented third, fourth and fifth least significant bits, two-dimensional Hadamard inverse-transform means for performing a vertical and lateral separation type two-dimensional (8×8)th-order Hadamard inverse-transform on the second transform coefficient group whose first to sixth least significant bits are supplemented by the two-dimensional bit supplement means to obtain picture element values, and image signal output means for arranging the picture element values obtained by the two-dimensional Hadamard inverse-transform means in a matrix of 8 picture elements×8 lines and outputting the arranged picture element values as an image signal.

According to a tenth aspect of the present invention, an Hadamard transform coding/decoding system having an Hadamard transformer and an Hadamard inverse transformer comprises a first buffer memory for storing an image signal, an Hadamard transformer for reading out the image signal from the first buffer memory every plural picture elements performing an N-th order Hadamard transform on the read-out image signal, a bit delete unit for deleting predetermined bits from transform coefficients which are output from the Hadamard transformer, a variable-length coder for performing a variable-length coding according to an appearance frequency of data values on upper bits and supplement information which are output signals of the bit delete unit, a variable-length decoder for performing an inverse processing to that of the variable-length coder on the output of the variable-length coder, and outputting upper bits and the supplement information, a bit restoring unit for adding the deleted bits of the transform coefficients on the basis of the supplement information in consideration of a bit pattern correlation between transform coefficients for the output of the variable-length decoder, an Hadamard inverse transformer for performing an N-th order Hadamard inverse transform on the transform coefficients of the bit restoring unit to output picture element values, and a second buffer memory for storing the picture element values of the Hadamard inverse transformer and then converting the picture element values from parallel data to serial data.

According to the one-dimensional Hadamard transform coding/decoding method for image signals, the input image signal is blocked every 8 picture elements in the blocking step, and the eighth-order Hadamard transform is performed on blocked picture values to obtain the transform coefficients in the Hadamard transform step. In the bit delete step, 1 bit, 4 bits and 7 bits are extracted from the least significant bits, the second least significant bits and the third least significant bits respectively and from predetermined positions in the block for the obtained transform coefficients, and output as the supplement information. In addition, the transform coefficients from which the least significant bits, the second least significant bits and the third least significant bits are deleted are output. In the record/transmit(output) step, the supplement information and the transform coefficients from which the first, second and third least significant bits are deleted are recorded/transmitted, (output) and in the reproduction/reception(input) step the recorded or transmitted transform coefficients and the supplement information are reproduced or received. In the bit supplement step, according to the supplement information reproduced or received in the reproduction/reception(input) step, the least significant bits of all the transform coefficients are supplemented on the basis of information of 1 bit per block which represents the least significant bits of the transform coefficients, the second least significant bits of all the transform coefficients are supplemented on the basis of information of 4 bits per block which represents the second significant bits of the transform coefficients, and the third least significant bits of all the transform coefficients are supplemented on the basis of information of 7 bits per block which represents the third significant bits of the transform coefficients. In the Hadamard inverse-transform step, the eighth-order Hadamard inverse-transform is performed on the transform coefficients whose first, second and third least significant bits are supplemented, thereby obtaining the picture element values, and in the image signal output step the obtained picture element values are arranged into eight picture elements and output as the image signal.

According to the one-dimensional Hadamard transform coding apparatus for image signals, the blocking means blocks the input image signal every 8 picture elements, and the Hadamard transform means performs the eighth-order Hadamard transform on the picture elements blocked by the blocking means to obtain the transform coefficients. The bit delete means extracts, from predetermined positions in each block, 1 bit, 4 bits and 7 bits from the least significant bits, the second least significant bits and the third least significant bits respectively for the obtained transform coefficients and outputs the extracted bits as supplement information. In addition, the bit delete means outputs the transform coefficients from which the least significant bits, the second least significant bits and the third least significant bits are deleted. The record/transmit means records or transmits the transform coefficients and the supplement information.

According to the one-dimensional Hadamard transform decoding apparatus for image signals, the reproduction/reception means reproduces or receives the recorded or transmitted transform coefficients and the supplement information, and the bit supplement means supplements the least significant bits of all the transform coefficients on the basis of information of 1 bit per block which is a part of the supplement information and represents the least significant bits of the transform coefficients, the second least significant bits of all the transform coefficients on the basis of information of 4 bits per block which is a part of the supplement information and represents the second least significant bits of the transform coefficients, and the third least significant bits of all the transform coefficients on the basis of information of 7 bits per block which is a part of the supplement information and represents the third least significant bits of the transform coefficients. The Hadamard inverse-transform means performs the eighth-order Hadamard inverse-transform on the transform coefficients whose first, second and third least significant bits are supplemented in the bit supplement means, thereby obtaining the picture element values, and the image signal output means arranges the obtained picture element values into eight picture elements and outputs the arranged eight picture elements as an image signal.

According to the two-dimensional Hadamard transform coding/decoding method, in the blocking step the input image signal is blocked every 8 picture elements×8 lines, and in the first Hadamard transform step the picture element values blocked in the blocking step are further blocked into eight groups in any one of a column direction and a line direction, and the eighth-order Hadamard transform is performed on the picture element values of each group to obtain the first transform coefficient group. In the first bit delete step, for the obtained first transform coefficient group obtained, the least significant bits of the transform coefficients are reduced to 1 bit per group, the second least significant bits of the transform coefficients are reduced to 4 bits per group, and the third least significant bits of the transform coefficients are reduced to 7 bits per group to output totally 96 bits per block as first supplement information, and a second transform coefficient group from which the first, second and third least significant bits are deleted is output. In the second Hadamard transform step, the transform coefficients representing the same frequency component are rearranged in each block for the second transform coefficient groups to obtain new eight groups, and the eighth-order Hadamard transform is performed on the transform coefficients belonging to each of the new groups to obtain a third transform coefficient group. In the second bit delete step, for the third transform coefficient group obtained in the second Hadamard transform step, the least significant bits of the transform coefficients are reduced to 1 bit per group, the second least significant bits of the transform coefficients are reduced to 4 bits per group, and the third least significant bits of the transform coefficients are reduced to 7 bits per group to output totally 96 bits per block as second supplement information, and outputs a fourth transform coefficient group from which the first, second and third least significant bits are deleted. In the recording/transmitting(outputting) step, the fourth transform coefficient group output in the second bit delete step, the first supplement information and the second supplement information are recorded or transmitted. In the reproducing/ receiving(inputting) step, the recorded or transmitted fourth transform coefficient group, the first supplement information and the second supplement information are recorded or received. In the first bit supplement step, the fourth transform coefficient group is grouped in accordance with the second supplement information, and then for each group the least significant bits of all the transform coefficients are supplemented on the basis of 1-bit information per group representing the least significant bits of the transform coefficients, the second least significant bits of all the transform coefficients are supplemented on the basis of 4-bit information per group representing the second least significant bits of the transform coefficients, and the third least significant bits of all the transform coefficients are supplemented on the basis of 7-bit information per group representing the third least significant bits of the transform coefficients to thereby restore the third transform coefficient group. In the first Hadamard inverse-transform step, the eighth-order Hadamard inverse-transform is performed on the third transform coefficient group restored in the first bit supplement step every group to obtain the second transform coefficient group. In the second bit supplement step, for the second transform coefficient group obtained in the first Hadamard inverse-transform step, the transform coefficients located at the same position in the group are rearranged every block to obtain new eight groups, and for the transform coefficients of each group thus obtained, the least significant bits of all the transform coefficients are supplemented on the basis of 1-bit information per group representing the least significant bits of the transform coefficients, the second least significant bits of all the transform coefficients are supplemented on the basis of 4-bit information per group representing the second least significant bits of the transform coefficients, and the third least significant bits of all the transform coefficients are supplemented on the basis of 7-bit information per group representing the third least significant bits of the transform coefficients in accordance with the first supplement information obtained in the reproducing/receiving(inputting) step to thereby restore the first transform coefficient group. In the second Hadamard inverse-transform step, the eighth-order Hadamard inverse-transform is performed on the first transform coefficient group restored in the second bit supplement step every group to obtain picture element values. In the image signal output step, the picture element values obtained in the second Hadamard inverse-transform step are arranged in a matrix of 8 picture elements×8 lines, and then output as an image signal.

According to the two-dimensional Hadamard transform coding apparatus, the blocking means blocks an input image signal every 8 picture elements×8 lines, and the first Hadamard transform means groups the picture element values blocked by the blocking means into eight groups in any one of a column direction and a line direction and performs the eighth-order Hadamard transform on the picture element values of each group to obtain a first transform coefficient group. The first bit delete means reduces: for the first transform coefficient group obtained by the first Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and outputs a second transform coefficient group from which the first, second and third least significant bits are deleted. The second Hadamard transform means rearranges transform coefficients representing the same frequency component in each block to obtain new eight groups for the second transform coefficient group, and performs the eighth-order Hadamard transform on transform coefficients belonging to each of the new groups to obtain a third transform coefficient group. The second bit delete means reduces: for the third transform coefficient group obtained by the second Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as second supplement information, and outputs a fourth transform coefficient group from which the first, second and third least significant bits are deleted. The recording/transmitting means records or transmits the fourth transform coefficient group output from the second bit delete means, the first supplement information and the second supplement information.

According to the two-dimensional Hadamard transform decoding apparatus for image signals, the reproducing/receiving(inputting) means reproduces or receives recorded or transmitted first transform coefficient group and two pairs of supplement information. The first bit supplement means groups the first transform coefficient group in accordance with one pair of the two pairs of the supplement information into eight groups each containing eight transform coefficients, and then supplements: every group, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients. The first Hadamard inverse-transform means performs the eighth-order Hadamard inverse-transform on the second transform coefficient group whose first, second and third least significant bits are supplemented by the first bit supplement means, every group when the bit supplement is completed, thereby obtaining the third transform coefficient group. The second bit supplement means groups the third transform coefficient group obtained by the first Hadamard inverse-transform means into eight groups in accordance with the other pair of the two pairs of the supplement information, and then supplements; the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients. The second Hadamard inverse-transform means performs the eighth-order Hadamard inverse-transform on the fourth transform coefficient group whose first, second and third least significant bits are supplemented by the second bit supplement means, every group when the second bit supplement is completed, thereby obtaining picture element values. The image signal output means arranges the picture element values obtained in the second Hadamard inverse-transform means in a matrix of 8 picture elements×8 lines and outputs the arranged picture element values as an image signal.

According to the two-dimensional Hadamard transform coding/decoding method, in the blocking step, the input image signal is blocked every 8 picture elements×8 lines, and in the two-dimensional Hadamard transform step the vertical and lateral separation type two-dimensional (8×8) th-order Hadamard transform is performed on picture elements of each block blocked by the blocking step which are blocked in the blocking step to obtain a first transform coefficient group. In the two-dimensional bit delete step, for the first transform coefficient group obtained in the two-dimensional Hadamard transform step, the least significant bits of the transform coefficients are reduced to 1 bit every block, the second least significant bits of the transform coefficients are reduced to 7 bits every block, the third least significant bits of the transform coefficients are reduced to 22 bits every block, the fourth least significant bits are reduced to 42 bits per block, the fifth least significant bits are reduced to 57 bits per block, and the sixth least significant bits are reduced to 63 bits per block to output totally 192 bits per block as supplement information, and a second transform coefficient group from which the first to sixth least significant bits are deleted is output.

In the recording/transmitting step, the second transform coefficient group and the supplement information are recorded or transmitted, and in the reproducing/receiving step, the recorded or transmitted second transform coefficient group and the supplement information are reproduced or received. In the two-dimensional bit supplement step, for the second transform coefficient group reproduced or received in the reproducing/receiving step and on the basis of the supplement information, the least significant bits of all the transform coefficients are supplemented on the basis of 1-bit information per block representing the least significant bits of the transform coefficients, the second least significant bits of all the transform coefficients are supplemented on the basis of 7-bit information per block representing the second least significant bits of the transform coefficients, the third least significant bits of all the transform coefficients are supplemented on the basis of 22-bit information per block representing the third least significant bits of the transform coefficients, the fourth least significant bits of all the transform coefficients are supplemented on the basis of 42-bit information per block representing the fourth least significant bits of the transform coefficients and the supplemented third least significant bits, the fifth least significant bits of all the transform coefficients are supplemented on the basis of 57-bit information per block representing the fifth least significant bits of the transform coefficients and the supplemented third and fourth least significant bits, and the sixth least significant bits of all the transform coefficients are supplemented on the basis of 63-bit information per block representing the sixth least significant bits of the transform coefficients and the supplemented third, fourth and fifth least significant bits, thereby restoring the first transform coefficient group. In the two-dimensional Hadamard inverse-transform step, the vertical and lateral separation type two-dimensional (8×8)th-order Hadamard inverse-transform is performed on the first transform coefficient group restored in the two-dimensional bit supplement step to obtain picture element values, and in the image signal output step the picture element values obtained in the two-dimensional Hadamard inverse-transform step are arranged in a matrix of 8 picture elements×8 lines and output as the image signal.

According to the two-dimensional Hadamard transform coding apparatus, the blocking means blocks the input image signal every 8 picture elements×8 lines, and the two-dimensional Hadamard transform means performs the vertical and lateral separation type two-dimensional (8×8) th-order Hadamard transform on the picture elements of each block blocked by the blocking means which are blocked by the blocking means to obtain a first transform coefficient group. The two-dimensional bit delete means extracts: from predetermined positions in each block, 1 bit from the least significant bits of the transform coefficients; 7 bits from the second least significant bits of the transform coefficients; 22 bits from the third least significant bits of the transform coefficients; 42 bits from the fourth least significant bits; 57 bits from the fifth least significant bits; and 63 bits from the sixth least significant bits for the first transform coefficient group to output the extracted bits as supplement information, and outputs a second transform coefficient group from which the first to sixth least significant bits are deleted. The recording/transmitting(outputting) means records or transmits the second transform coefficient group and the supplement information.

According to the two-dimensional Hadamard transform decoding apparatus, the reproducing/receiving(inputting) means reproduces or receives the recorded or transmitted first transform coefficient group and supplement information, and the two-dimensional bit supplement means supplements: for the first transform coefficient group, the least significant bits of all the transform coefficients on the basis of 1-bit information per block of the supplement information, which represents the least significant bits of the transform coefficients; the second least significant bits of all the transform coefficients on the basis of 7-bit information per block of the supplement information, which represents the second least significant bits of the transform coefficients; the third least significant bits of all the transform coefficients on the basis of 22-bit information per block of the supplement information, which represents the third least significant bits of the transform coefficients; the fourth least significant bits of all the transform coefficients on the basis of 42-bit information per block of the supplement information, which represents the fourth least significant bits of the transform coefficients and the supplemented third least significant bits; the fifth least significant bits of all the transform coefficients on the basis of 57-bit information per block of the supplement information, which represents the fifth least significant bits of the transform coefficients, and the supplemented third and fourth least significant bits; and the sixth least significant bits of all the transform coefficients on the basis of 63-bit information per block of the supplement information, which represents the sixth least significant bits of the transform coefficients, and the supplemented third, fourth and fifth least significant bits. The two-dimensional Hadamard inverse-transform means performs the vertical and lateral separation type two-dimensional (8×8)th-order Hadamard inverse-transform on the second transform coefficient group to obtain picture element values, and the image signal output means arranges the picture element values in a matrix of 8 picture elements×8 lines and outputs the arranged picture element values as the image signal.

BRIEF DESCRIPTION OF THE DRAWINGS

FIG. 3 is a block diagram showing the construction of a bit delete unit shown in FIG. 2;

FIG. 7 is a flowchart showing an embodiment of a two-dimensional Hadamard transform coding/decoding method for image signals according to this invention;

FIG. 8 is a block diagram showing embodiments of a two-dimensional Hadamard transform coding apparatus and a two-dimensional Hadamard transform decoding apparatus to which the two-dimensional Hadamard transform coding/decoding method according to this invention is applied;

FIG. 10 is a block diagram showing another embodiment of the two-dimensional Hadamard transform coding apparatus and the two-dimensional Hadamard transform decoding apparatus to which the two-dimensional Hadamard transform coding/decoding method shown in FIG. 9 is applied;

FIGS. 13A to 13F are diagrams showing an example of bit selection in a bit selector of FIG. 11;

FIGS. 14A to 14C is a diagram showing a bit arrangement in the bit selector of FIG. 11;

FIG. 17 is a flowchart showing supplemental processing of the third least significant bits in the bit supplement unit of FIG. 12;

FIG. 18 is a flowchart showing supplemental processing of the fourth least significant bits in the bit supplement unit of FIG. 12;

FIG. 19 is a flowchart showing supplemental processing of the fifth least significant bits in the bit supplement unit of FIG. 12.

PREFERRED EMBODIMENTS OF THE INVENTION

Preferred embodiments according to the present invention will be described hereunder with reference to the accompanying drawings.

Figure 1:
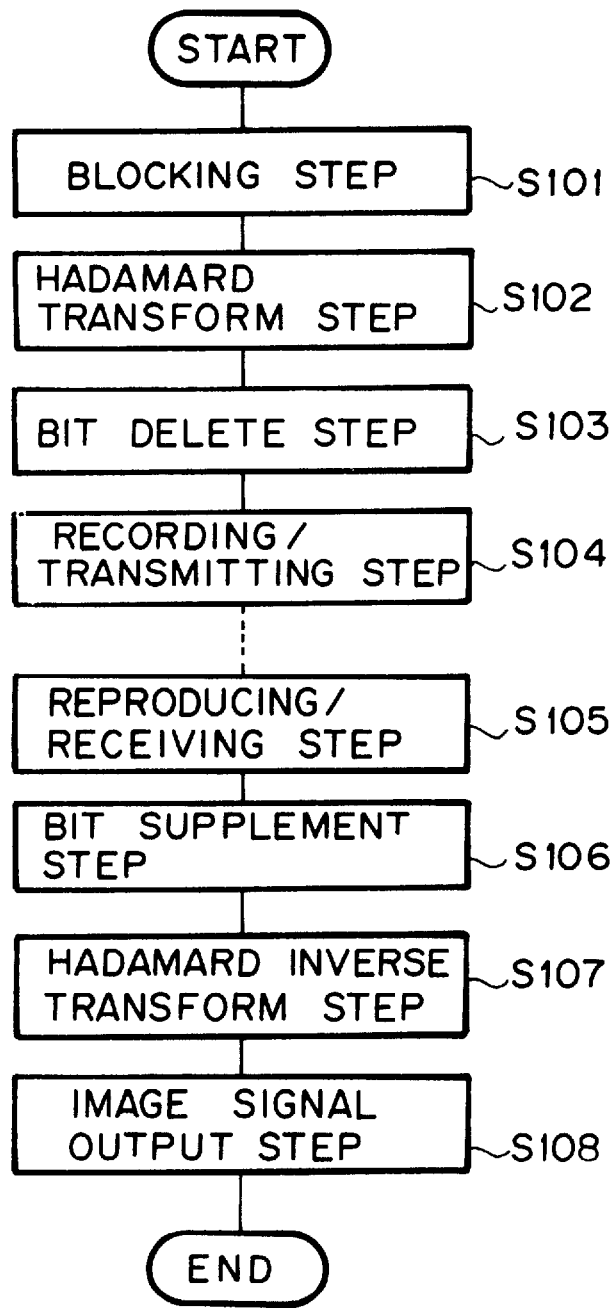
FIG. 1 is a flowchart which illustrates an embodiment of a one-dimensional Hadamard transform coding/decoding method for image signals according to the present invention.

FIG. 1 is a flowchart showing an embodiment of a one-dimensional Hadamard transform coding/decoding method according to the present invention. The one-dimensional transform coding/decoding method of this embodiment includes: a blocking step S101 for blocking an input image signal (i.e., dividing the input image signal into blocks) every eight picture elements; an Hadamard transform step S102 for performing an eighth-order Hadamard transform on the blocked picture element values to obtain transform coefficients; a bit delete step S103 for extracting, from predetermined bit positions in each block for the transform coefficients, 1 bit, 4 bits and 7 bits from the least significant bits, the second least significant bits and the third least significant bits respectively to output these bits as supplement information, and outputting transform coefficients whose first, second and third least significant bits are deleted; a recording/transmitting step S104 for recording or transmitting the supplement information and the transform coefficients whose first, second and third least significant bits are deleted, a reproducing/receiving step S105 for reproducing or receiving the recorded or transmitted transform coefficients and the supplement information; a bit supplement step S106 for supplementing: on the basis of the reproduced or received supplement information, the least significant bits of all the transform coefficients from the 1-bit information per block representing the least significant bits of the transform coefficients; the second least significant bits of all the transform coefficients from the 4-bit information per block representing the second least significant bits of the transform coefficients; and the third least significant bits of all the transform coefficients from the 7-bit information per block representing the third least significant bits of the transform coefficients; an Hadamard inverse-transform step S107 for performing the eighth-order Hadamard inverse-transform on the transform coefficients whose first, second and third least significant bits are supplemented, thereby obtaining picture element values; and an image signal output step S108 for arranging the obtained picture element values into eight picture elements.

Figure 2:
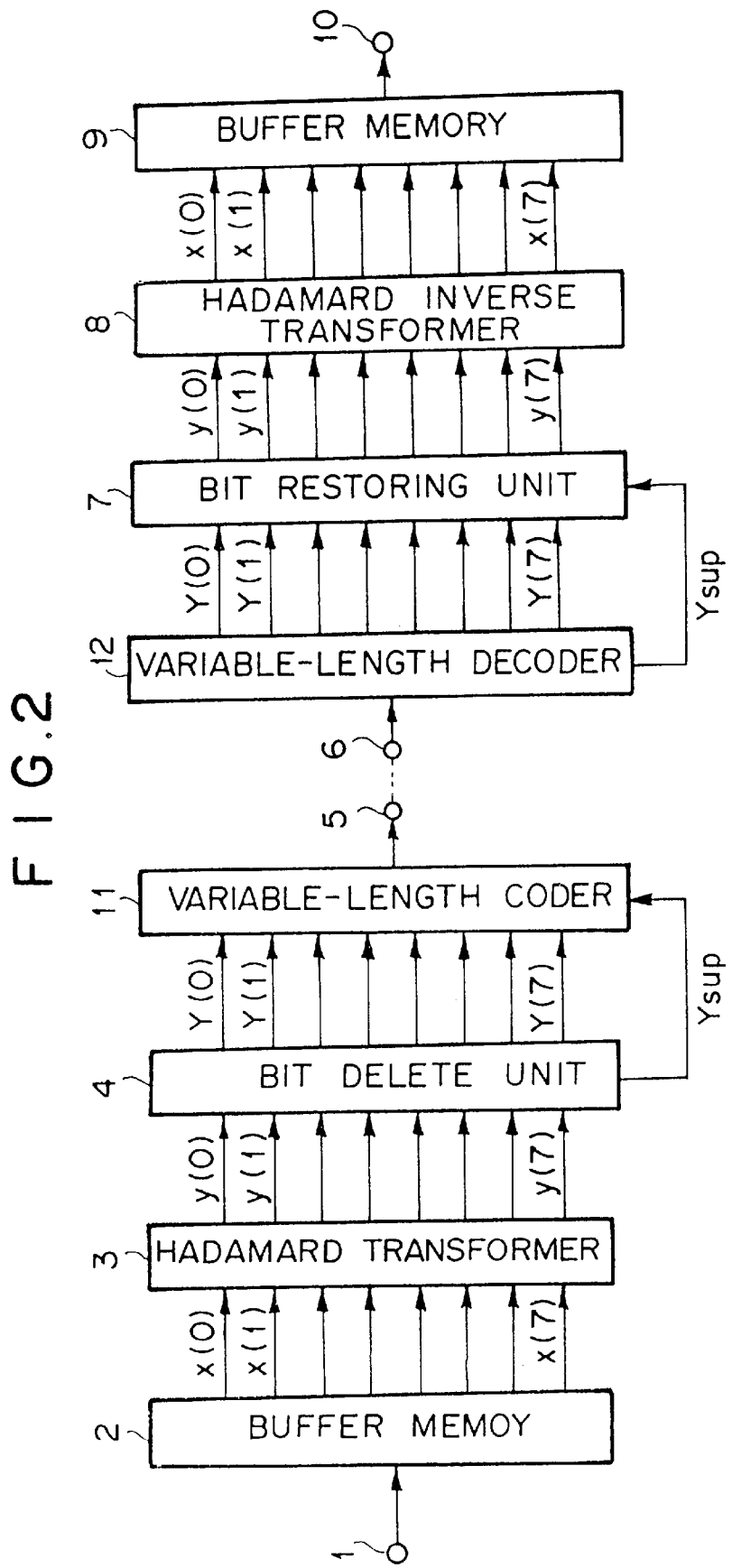
FIG. 2 is a block diagram showing embodiments of a one-dimensional Hadamard transform coding apparatus and a one-dimensional Hadamard transform decoding apparatus to which the one-dimensional Hadamard transform coding/decoding method according to this invention is applied.

FIG. 2 is a block diagram showing embodiments of a one-dimensional Hadamard transform coding apparatus and a one-dimensional Hadamard transform decoding apparatus to which the one-dimensional Hadamard transform coding/decoding method shown in FIG. 1 is applied. The one-dimensional Hadamard transform coding apparatus of this embodiment includes a buffer memory 2, an Hadamard transformer 3, a bit delete unit 4, and a variable-length coder 11. The one-dimensional Hadamard transform decoding apparatus of this embodiment includes a variable-length decoder 12, a bit restoring unit 7, an Hadamard inverse-transformer 8, and a buffer memory 9. In FIG. 2, reference numeral 1 represents an image signal input terminal, reference numeral 5 represents a coded signal output terminal, reference numeral 6 represents a coded signal input terminal and reference numeral 10 represents an image signal output terminal.

An image signal which is input from the image signal input terminal 1 is stored in the buffer memory 2, then read out every eight picture elements x(0) to x(7) and then subjected to an eighth-order Hadamard transform in the Hadamard transformer 3. The bit delete unit 4 deletes predetermined bits from transform coefficients y(0) to y(7) which are output from the Hadamard transformer 3. The upper significant bits Y(0) to Y(7) which are output from the bit delete unit 4 and supplement information Ysup are subjected to a variable-length coding in accordance with the appearance frequency of data values in the variable-length coder 11, and then recorded or transmitted in the coded signal output terminal 5.

The coded signal is reproduced or received through the coded signal input terminal 6. In the variable-length decoder 12, the reproduced or received coded signal is subjected to an inverse processing to that of the variable-length coder 11, and then input as the upper significant bits Y(0) to Y(7) and the supplement information Ysup. The bit restoring unit 7 restores and adds those bits of the transform coefficients y(0)

to y(7) which are deleted at the coding side, in accordance with the supplement information Ysup and in consideration of a bit pattern correlation of the transform coefficients y(0) to y(7). The transform coefficients y(0) to y(7) which are an output signal of the bit restoring unit 7 are subjected to an eighth-order Hadamard inverse transform in the Hadamard inverse-transformer 8 and then output as picture element values x(0) to x(7). Thereafter, the picture element values x(0) to x(7) are rearranged from parallel data to serial data, and then output as a restored image signal from the image signal output terminal 10. Conventional techniques may be applied to the Hadamard transformer 3 and the Hadamard inverse-transformer 8.

FIG. 3 is a block diagram showing an example of the construction of the bit delete unit 4. For the respective input eight transform coefficients y(0) to y(7), the upper significant bits Y(0) to Y(7) from which the first, second and third least significant bits are deleted are output without modification. Only 1 bit is selected from the least significant bits y(0)[1] to y(7)[1] of the transform coefficients y(0) to y(7) in a bit selector 13, and 4 bits are selected from the second least significant bits y(0)[2] to y(7)[2] of the transform coefficients y(0) to y(7) in a bit selector 14. Further, 7 bits are selected from the third least significant bits y(0)[3] to y(7)[3] of the transform coefficients y(0) to y(7) in a bit selector 15. All these bits are collectively output as the supplement information Ysup. The supplement information Ysup comprises 12 bits per block.

Figure 4A:
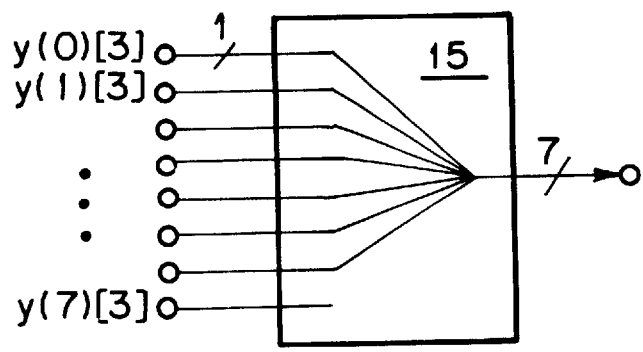
FIGS. 4A to 4C are block diagrams showing the construction of a bit selector of FIG. 3.
Figure 4B:
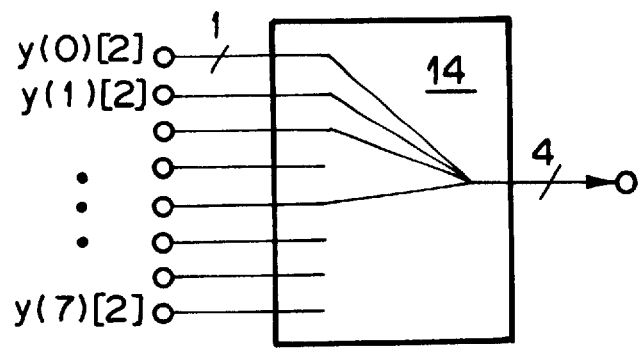
Figure 4C:
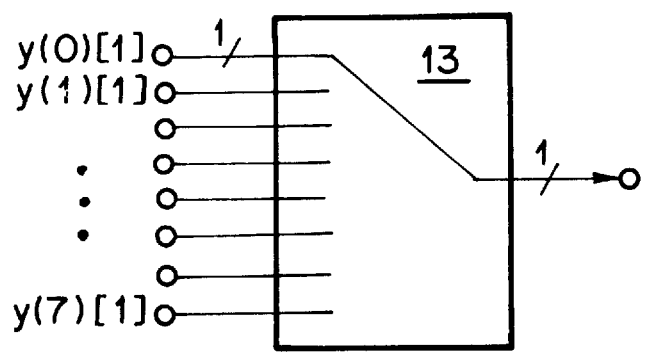

FIGS. 4A, 4B and 4C are block diagrams showing the construction of the bit selectors 13, 14 and 15. FIG. 4C shows the construction of the bit selector 13, and it selects and outputs only the least significant bit y(0)[1] of the transform coefficient y(0) from the input eight bits y(0)[1] to y(7)[1]. FIG. 4B shows the construction of the bit selector 14, and it selects and outputs only the second least significant bits y(0)[2], y(1)[2], y(2)[2], y(4)[2] of the transform coefficients y(0),y(1),y(2),y(4) from the input eight bits y(0)[2] to y(7)[2]. FIG. 4A shows the construction of the bit selector 15, and it selects and outputs only the third least significant bits y(0)[3] to y(6)[3] of the transform coefficients y(0) to y(6) other than the transform coefficient y(7) from the input eight bits y(0)[3] to y(7)[3].

The same output is obtained even when the bit of any one of the transform coefficients other than y(0) is selected in the bit selector 13 in FIG. 4C. Even when a transform coefficient not to be selected in the bit selector 15 is set to any one of the transform coefficients other than y(7) in FIG. 4A, the same effect can be obtained by some treatment at the decoding side. Further, in the bit selector 14 of FIG. 4B, if those bits which are deleted in consideration of the bit pattern correlation of the transform coefficients y(0) to y(7) are selected as a restorable combination, the selection of transform coefficients other than as shown in FIG. 4B is possible by some treatment at the decoding side. For example, a combination of y(3), y(5), y(6) and y(7) or a combination of y(0), y(1), y(3) and y(5) may be selected.

Figure 5:
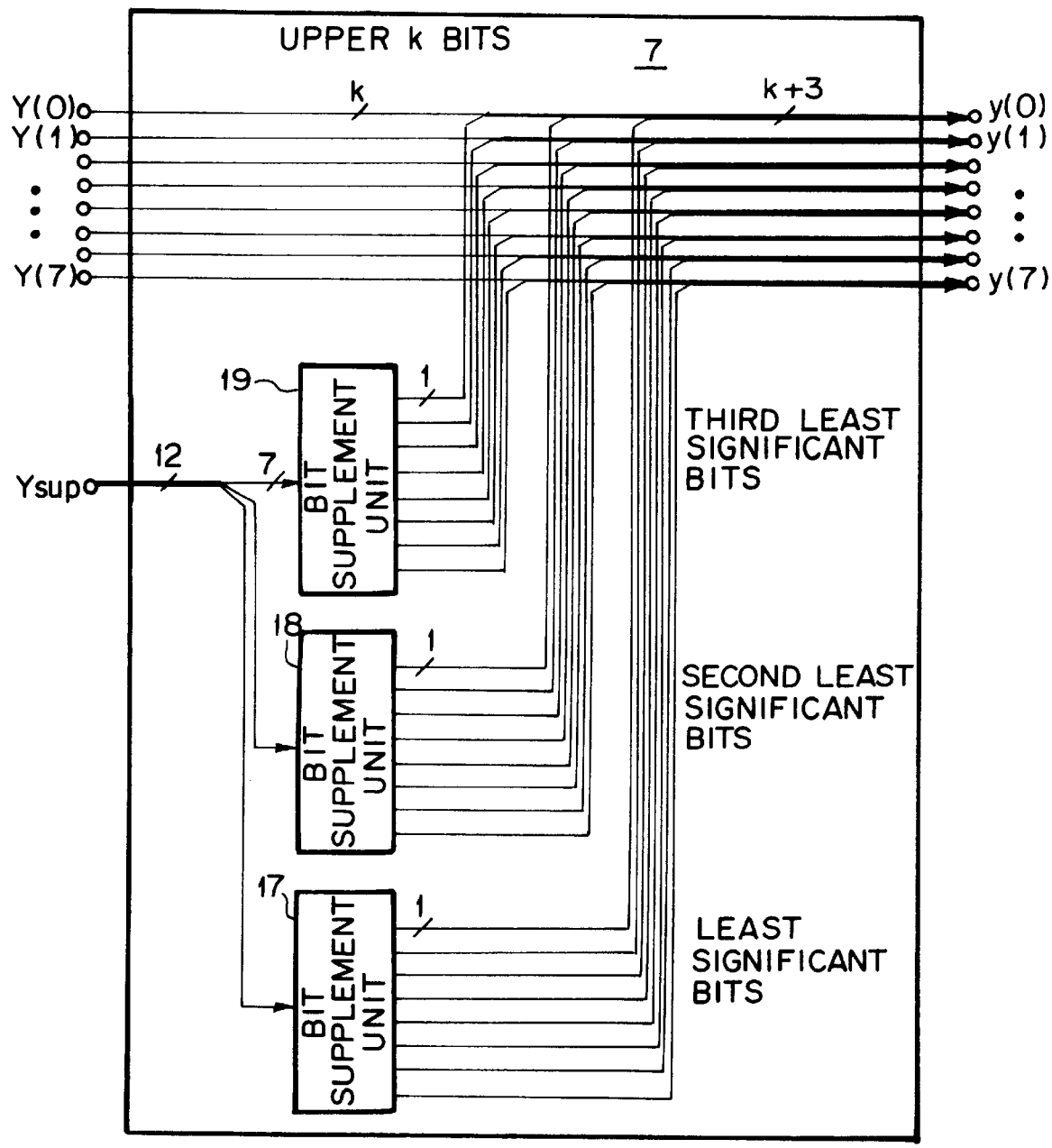
FIG. 5 is a block diagram showing the construction of a bit restoring unit of FIG. 2.

FIG. 5 is a block diagram showing the construction of the bit restoring unit 7. The supplement information Ysup is decomposed into the 1-bit information of the least significant bit, the 4-bit information of the second least significant bit and the 7-bit information of the third least significant bit. The information of the least significant bit is input to a bit supplement unit 17, the information of the second least significant bits is input to a bit supplement unit 18, and the information of the third least significant bits is input to a bit supplement unit 19. the bit supplement units 17, 18 and 19 perform the respective processing corresponding to the bit selectors 13, 14 and 15, respectively. In the bit restoring unit 7, the outputs of the bit supplement units 19, 18 and 17 are added to the upper significant bits Y(0) to Y(7) of the respective transform coefficients y(0) to y(7) as the third least significant bits, the second least significant bits and the least significant bit, respectively, and then output.

Figure 6A:
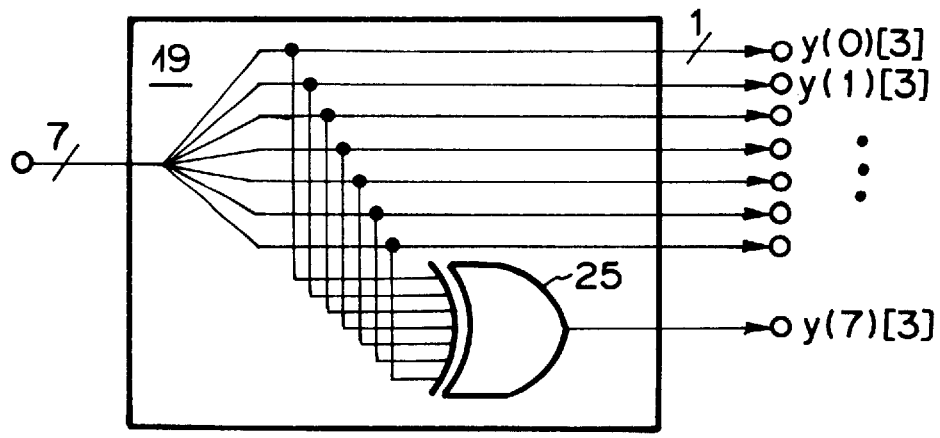
FIGS. 6A to 6C are block diagrams showing the construction of a bit supplement unit of FIG. 5.
Figure 6B:
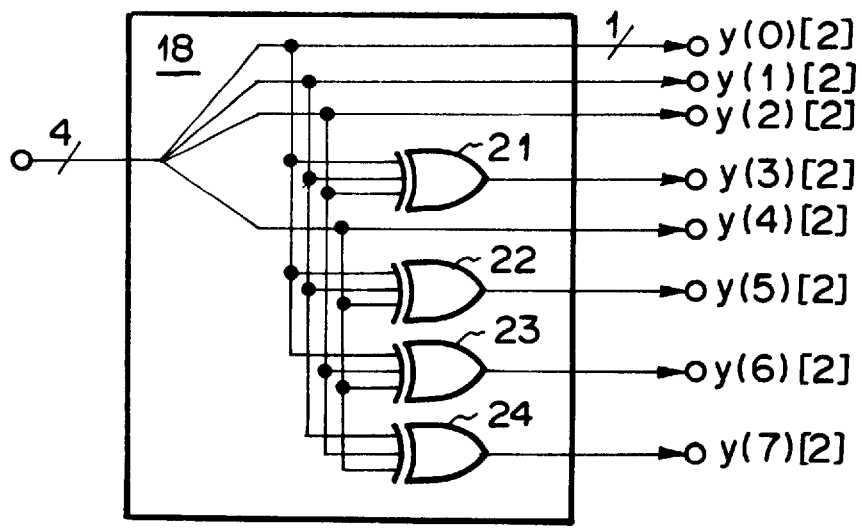
Figure 6C:
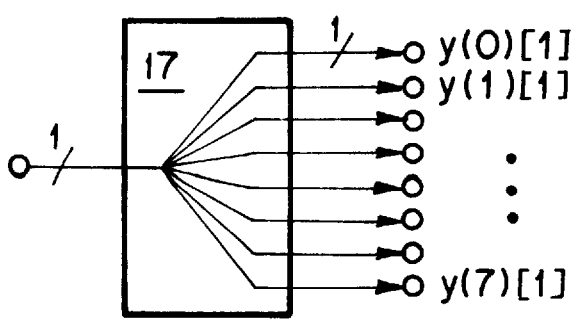

FIGS. 6A, 6B and 6C are block diagrams showing the construction of the bit supplement units 17, 18 and 19, and they serve to supplement those bits which are deleted in the bit selectors 13, 14 and 15 as shown in FIGS. 4A, 4B and 4C, respectively. FIG. 6C shows the construction of the bit supplement unit 17, and it copies and outputs the input 1 bit as the least significant bits y(0)[1] to y(7)[1] of all the transform coefficients y(0) to y(7). FIG. 6B shows the construction of the bit supplement unit 18, and it outputs the input 4 bits as the second least significant bits y(0)[2], y(1)[2], y(2)[2], y(4)[2] of the transform coefficients y(0), y(1), y(2), y(4). In addition, the bit supplement unit 18 performs an exclusive OR operation on the second least significant bits y(0)[2], y(1)[2], y(2)[2] of the transform coefficients y(0), y(1) and y(2) in an exclusive OR operation unit 21 and outputs an operation result as the second least significant bit y(3)[2] of the transform coefficient y(3). Further, the second least significant bits y(0)[2], y(1)[2] and y(4)[2] of the transform coefficients y(0), y(1) and y(4) are subjected to the exclusive OR operation in an exclusive OR operation unit 22, and an operation result is output as the second least significant bit y(5)[2] of the transform coefficient y(5). The second least significant bits y(0)[2], y(2)[2] and y(4)[2] of the transform coefficients y(0), y(2) and y(4) are subjected to the exclusive OR operation in an exclusive OR operation unit 23, and an operation result is output as the second least significant bit y(6)[2] of the transform coefficient y(6). The second least significant bits y(1)[2], y(2)[2] and y(4)[2] of the transform coefficients y(1), y(2) and y(4) are subjected to the exclusive OR operation in an exclusive OR operation unit 24, and an operation result is output as the second least significant bit y(7)[2] of the transform coefficient y(7).

FIG. 6A shows the construction of the bit supplement unit 19, and it outputs the input 7 bits as the third least significant bits y(0)[3] to y(6)[3] of the transform coefficients y(0) to y(6). All of the input 7 bits are subjected to the exclusive OR operation in an exclusive operation unit 25, and an operation result is output as the third least significant bit y(7)[3] of the transform coefficient y(7).

The variable-length coder 11 serves to reversibly code the upper significant bits Y(0) to Y(7) of the transform coefficients y(0) to y(7) and the supplement information Ysup. The coding operation of the upper significant bits Y(0) to Y(7) may be performed according to a variable-length coding system of transform coefficients of a discrete cosine transform which is described in ISO standards 10918-1, for example. The supplement information Ysup may be subjected to the variable-length coding operation as described above, or it may be directly used as a bit pattern. Besides, there may be used a method of coding the supplement information Ysup by affixing the supplement information Ysup to the upper significant bits Y(0) to Y(7). For example, each bit of the supplement information Ysup is located at an original bit position for the transform coefficients y(0) to y(7), and "0" is located for those bits which are deleted in the bit delete unit 4. Alternatively, the upper bits are shifted down at the bit-deleted positions.

FIG. 7 is a flowchart showing an embodiment of a two-dimensional Hadamard transform coding/decoding method according to the present invention. The two-dimensional Hadamard transform coding/decoding method of this embodiment includes: a blocking step S201 for blocking an input image signal every 8 picture elements×8 lines; a first Hadamard transform step S202 for further grouping the blocked picture element values into eight groups in any one of a column direction and a line direction and performing the eighth-order Hadamard transform on the picture element values of each group to obtain a first transform coefficient group; a first bit delete step S203 for reducing: for the first transform coefficient group, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and also outputting a second transform coefficient group from which the first, second and third least significant bits are deleted; a second Hadamard transform step S204 for rearranging transform coefficients representing the same frequency component in a block for the second transform coefficient group to obtain new eight groups, and performing the eighth-order Hadamard transform on the transform coefficients belonging to each of the new groups to obtain a third transform coefficient group; a second bit delete step S205 for reducing; for the third transform coefficient group, the least significant bits of the transform coefficients to 1 bit per group, the second least significant bits of the transform coefficients to 4 bits per group; and the third least significant bits of the transform coefficients to 7 bits per group to output totally 96 bits per block as second supplement information, and outputting a fourth transform coefficient group from which the first, second and third least significant bits are deleted; a recording/transmitting step S206 for recording or transmitting the fourth transform coefficient group and the first and second supplement information; a reproducing/ receiving step S207 for reproducing or receiving the recorded or transmitted fourth transform coefficient group and the first and second supplement information; a first bit supplement step S208 for grouping the fourth transform coefficient group according to the second supplement information, and then supplementing for every group, the least significant bits of all the transform coefficients from the 1-bit information per group representing the least significant bits of the transform coefficients, the second least significant bits of all the transform coefficients from the 4-bit information per group representing the second least significant bits of the transform coefficients, and the third least significant bits of all the transform coefficients from the 7-bit information per group representing the third least significant bits of the transform coefficients to restore the third transform coefficient group; a first Hadamard inverse-transform step S209 for performing an eighth-order Hadamard inverse-transform on the restored third transform coefficient group to obtain the second transform coefficient group; a second bit supplement step S210 for rearranging, in each block, transform coefficients which are located at the same position in the groups, thereby obtaining new eight groups, and supplementing the least significant bits of all the transform coefficients from the 1-bit information per group representing the least significant bits of the transform coefficients, the second least significant bits of all the transform coefficients from the 4-bit information per group representing the second least significant bits of the transform coefficients, and the third least significant bits of all the transform coefficients from the 7-bit information per group representing the third least significant bits of the transform coefficients according to the first supplement information for the transform coefficients of each of the thus obtained groups to restore the first transform coefficient group; a second Hadamard inverse-transform step S211 for performing the eighth-order Hadamard inverse-transform on the restored first transform coefficient group every group to obtain picture element values; and an image signal output step S212 for arranging the obtained picture element values in a matrix of 8 picture elements×8 lines and outputting the arranged picture element values as an image signal.

FIG. 8 is a block diagram showing embodiments of a two-dimensional Hadamard transform coding apparatus and a two-dimensional Hadamard transform decoding apparatus to which the two-dimensional transform coding/decoding method for image signals shown in FIG. 7 is applied. The two-dimensional Hadamard transform coding apparatus for image signals according to this embodiment includes a buffer memory 32, a horizontal-direction Hadamard transformer 33, a horizontal-direction bit delete unit 34, a vertical-direction Hadamard transformer 35, a vertical-direction bit delete unit 36, and a variable-length coder 37.

The two-dimensional Hadamard transform decoding apparatus for image signals according to this embodiment includes a variable-length decoder 42, a vertical-direction bit restoring unit 43, a vertical-direction Hadamard inverse-transformer 44, a horizontal-direction bit restoring unit 45, a horizontal-direction Hadamard inverse-transformer 46, and a buffer memory 47. In FIG. 8, reference numeral 31 represents an image signal input terminal, reference numeral 38 represents a coded signal output terminal, reference numeral 41 represents a coded signal input terminal, and reference numeral 48 represents an image signal output terminal.

The image signal which is output from the image signal input terminal 31 is stored in the buffer memory 32, then read out every 8 picture elements×8 lines, and then subjected to the Hadamard transform in a horizontal direction by the horizontal-direction Hadamard transformer 33. The horizontal-direction bit delete unit 34 deletes predetermined bits on each column from the transform coefficients which are output from the horizontal-direction Hadamard transformer 33, and output the deletion result to the vertical-direction Hadamard transformer 35. Further, it outputs horizontal-direction supplement information Ysup(H) to the variable-length coder 37. The vertical-direction Hadamard transformer 35 performs the Hadamard transform in the vertical direction on the transform coefficients from which the bits are deleted in the horizontal-direction bit delete unit 34. The vertical-direction bit delete unit 36 deletes predetermined bits on each line from the transform coefficients output from the vertical-direction Hadamard transformer 35, and outputs the delete result to the variable-length coder 37. Further, it outputs vertical-direction supplement information Ysup(V) to the variable-length coder 37. The transform coefficients output from the vertical-direction bit delete unit 36, the horizontal-direction supplement information Ysup (H) and the vertical-direction supplement information Ysup (V) are subjected to a variable-length coding in accordance with an appearance frequency of data values in the variable-length coder 37, and then recorded or transmitted from the coded signal output terminal 38.

The coded signal is reproduced or received through the coded signal input terminal 41. The reproduced or received coded signal is subjected to the inverse processing to that of the variable-length coder 37 in the variable-length decoder 42, and decomposed into the transform coefficients and both the horizontal-direction supplement information Ysup(H) and the vertical-direction supplement information Ysup(V).

The transform coefficients and the vertical-direction supplement information Ysup(V) are input to the vertical-direction bit restoring unit 43, and the horizontal-direction supplement information Ysup(H) is input to the horizontal-direction bit restoring unit 45. In the vertical-direction bit restoring unit 43, the bits which are deleted in the vertical-direction bit delete unit 36 are calculated on the basis of the vertical-direction supplement information Ysup(V) in consideration of the bit pattern correlation between the transform coefficients, and added to the input transform coefficients.

The output signal of the vertical-direction bit restoring unit 43 is subjected to the Hadamard inverse-transform in the vertical direction in the vertical-direction Hadamard inverse-transformer 44, and input to the horizontal-direction bit restoring unit 45. In the horizontal-direction bit restoring unit 45, the bits which are deleted in the horizontal-direction bit delete unit 34 are calculated on the basis of the horizontal-direction supplement information Ysup(H) in consideration of the bit pattern correlation between the transform coefficients, and added to the input transform coefficients.

The output signal of the horizontal-direction bit restoring unit 45 is subjected to the Hadamard inverse-transform in the horizontal direction in the horizontal-direction Hadamard inverse-transformer 46, rearranged from parallel data to serial data in the buffer memory 47, and then output as a decoded image signal from the image signal output terminal 48.

The horizontal-direction Hadamard transformer 33 may be constructed by stacking eight Hadamard transformers 3 as shown in FIG. 2 in the vertical direction while placing each of the Hadamard transformers 3 in the horizontal direction. Likewise, the vertical-direction Hadamard transformer 35 may be constructed by bundling eight Hadamard transformers 3 in the horizontal direction while placing each of the Hadamard transformers 3 in the vertical direction. The same is satisfied between each of the vertical-direction Hadamard inverse transformer 44 and the horizontal-direction Hadamard inverse-transformer 46 and the Hadamard inverse-transformer 8, between each of the horizontal-direction bit delete unit 34 and the vertical-direction bit delete unit 36 and the bit delete unit 4, and between each of the vertical-direction bit restoring unit 43 and the horizontal-direction bit restoring unit 45 and the bit restoring unit 7. Each of the horizontal-direction supplement information Ysup(H) and the vertical-direction supplement information Ysup(V) comprises 96 bits per block.

In FIG. 8, the combination of the horizontal-direction Hadamard transformer 33 and the horizontal-direction bit delete unit 34 may be replaced by the combination of the vertical-direction Hadamard transformer 35 and the vertical-direction bit delete unit 36. In this case, in the two-dimensional Hadamard transform decoding apparatus, the combination of the vertical-direction Hadamard inverse-transformer 44 and the vertical-direction bit restoring unit 43 must be replaced by the combination of the horizontal-direction Hadamard inverse-transformer 46 and the horizontal-direction bit restoring unit 45.

Figure 9:
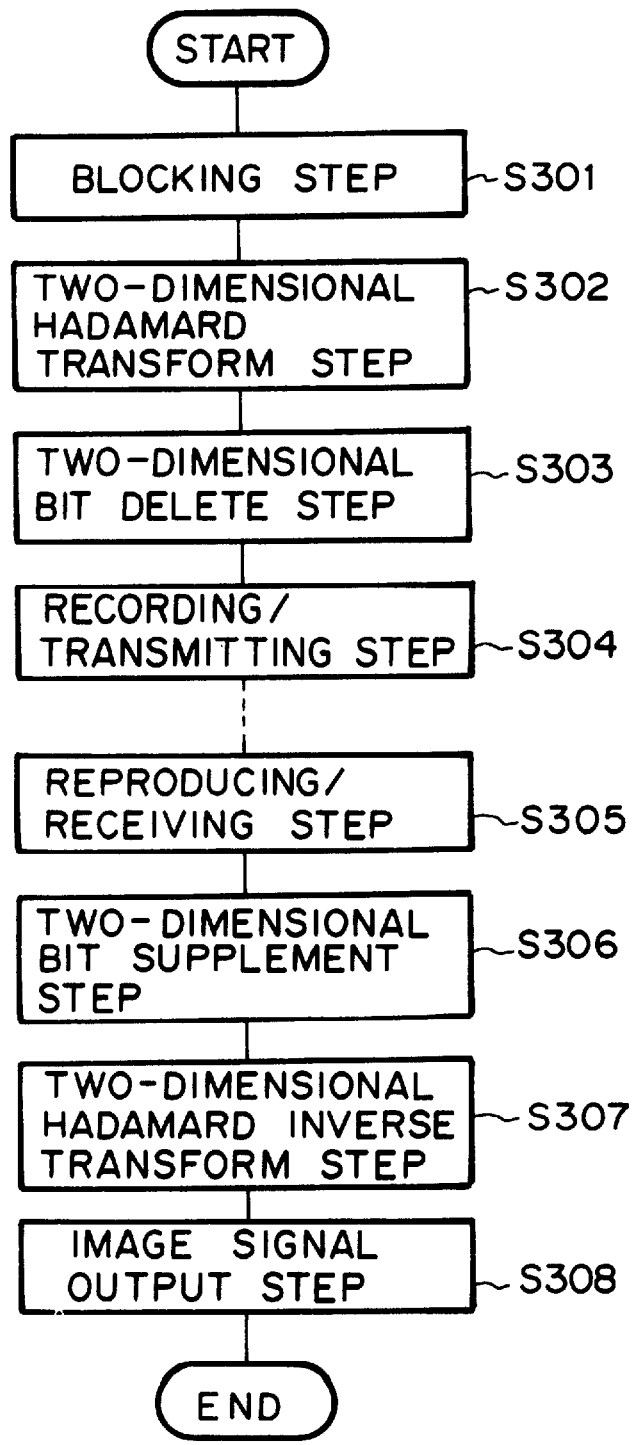
FIG. 9 is a flowchart showing another embodiment of the two-dimensional Hadamard transform coding/decoding method for image signals according to the present invention.

FIG. 9 is a flowchart showing another embodiment of the two-dimensional Hadamard transform coding/decoding method according to the present invention. The two-dimensional transform coding/decoding method of this embodiment includes: a blocking step S301 for blocking an input image signal every 8 picture elements×8 lines, a two-dimensional Hadamard transform step S302 for performing a vertical and lateral separation type two-dimensional (8×8)th-order Hadamard transform on the picture element values of each block to obtain a first transform coefficient group; a two-dimensional bit delete step S303 for reducing, the least significant bits of the transform coefficients to 1 bit per block, the second least significant bits of the transform coefficients to 7 bits per block, the third least significant bits of the transform coefficients to 22 bits per block, the fourth least significant bits of the transform coefficients to 42 bits; the fifth least significant bits of the transform coefficients to 57 bits, and the sixth least significant bits of the transform coefficients to 63 bits per block for the first transform coefficient group to output totally 192 bits as supplement information per block, and also outputting a second transform coefficient group from which the first to sixth least significant bits are deleted; a recording/transmitting step S304 for recording or transmitting the second transform coefficient group and the supplement information; a reproducing/receiving step S305 for reproducing or receiving the recorded or transmitted second transform coefficient group and the supplement information; a two-dimensional bit supplement step S306 for supplementing, for the reproduced or transmitted second transform coefficient group and on the basis of the supplement information, the least significant bits of all the transform coefficients from the 1-bit information per block representing the least significant bits of the transform coefficients, the second least significant bits of all the transform coefficients from the 7-bit information per block representing the second least significant bits of the transform coefficients, the third least significant bits of all the transform coefficients from the 22-bit information per block representing the third least significant bits of the transform coefficients, the fourth least significant bits of all the transform coefficients from the 42-bit information per block representing the fourth least significant bits of the transform coefficients and the supplemented third least significant bits, the fifth least significant bits of all the transform coefficients from the 57-bit information per block representing the fifth least significant bits of the transform coefficients and the supplemented third and fourth least significant bits, and the sixth least significant bits of all the transform coefficients from the 63-bit information per block representing the sixth least significant bits of the transform coefficients and the supplemented third, fourth and fifth least significant bits to restore the first transform coefficient group; a two-dimensional Hadamard inverse-transform step S307 for performing a vertical and lateral separation type two-dimensional (8×8)th-order Hadamard inverse-transform on the restored first transform coefficient group; and an image signal output step S308 for arranging the obtained picture element values into 8 picture elements×8 lines and outputting the arranged picture element values as an image signal.

FIG. 10 is a block diagram showing other embodiments of the two-dimensional Hadamard transform coding apparatus and the two-dimensional Hadamard transform decoding apparatus to which the two-dimensional Hadamard transform coding/decoding method for image signals shown in FIG. 9 is applied.

The two-dimensional Hadamard transform coding apparatus for image signals according to this embodiment includes a buffer memory 52, a horizontal-direction Hadamard transformer 53, a vertical-direction Hadamard transformer 55, a two-dimensional bit delete unit 56, and a variable-length coder 57. The two-dimensional Hadamard transform decoding apparatus for image signals according to this embodiment includes a variable-length decoder 62, a two-dimensional bit restoring unit 63, a vertical-direction Hadamard inverse-transformer 64, a horizontal-direction Hadamard inverse-transformer 66, and a buffer memory 67. In FIG. 10, reference numeral 51 represents an image signal input terminal, reference numeral 58 represents a coded signal output terminal, reference numeral 61 represents a coded signal input terminal and reference numeral 68 represents an image signal output terminal.

The image signal input from the image signal input terminal 51 is stored in the buffer memory 52, and then read out every 8 picture elements×8 lines. The read-out image signal is subjected to the Hadamard transform in the horizontal direction in the horizontal-direction Hadamard transformer 53, and then subjected to the Hadamard transform in the vertical direction in the vertical-direction Hadamard transformer 55. The two-dimensional bit delete unit 56 deletes predetermined bits from the transform coefficients output from the vertical-direction Hadamard transformer 55, and output the delete result to the variable-length coder 57. In addition, it outputs supplement information Ysup(2D) to the variable-length coder 57. The transform coefficients and the supplement information Ysup(2D) which are output from the two-dimensional bit delete unit 56 are subjected to the variable-length coding in accordance with an appearance frequency of data values in the variable-length coder 57, and then recorded or transmitted from the coded signal output terminal 58.

The coded signal is reproduced or received through the coded signal input terminal 61. The reproduced or received coded signal is subjected to the inverse processing to that of the variable-length coder 57 in the variable-length decoder 62 to be decomposed into the transform coefficients and the supplement information Ysup(2D), and input to the two-dimensional bit restoring unit 63. In the two-dimensional bit restoring unit 63, those bits which are deleted in the two-dimensional bit delete unit 56 are calculated on the basis of the supplement information Ysup(2D) in consideration of the bit pattern correlation between the transform coefficients, and added to the input transform coefficients. The output signal of the two-dimensional bit restoring unit 63 is subjected to the Hadamard inverse-transform in the vertical direction in the vertical-direction Hadamard inverse transformer 64, and then further subjected to the Hadamard inverse-transform in the horizontal direction in the horizontal-direction Hadamard inverse-transformer 66. The output signal of the horizontal-direction Hadamard inverse transformer 66 is rearranged from parallel data to serial data in the buffer memory 67, and output as a decoded image signal from the image signal output terminal 68.

The two-dimensional Hadamard transform coding apparatus and the two-dimensional Hadamard transform decoding apparatus shown in FIG. 10 have no units corresponding to the horizontal-direction bit delete unit 34 and the horizontal-direction bit restoring unit 45 which are provided to the two-dimensional Hadamard transform coding apparatus and the two-dimensional Hadamard transform decoding apparatus shown in FIG. 8. The buffer memory 52, the horizontal-direction Hadamard transformer 53, the horizontal-direction Hadamard inverse transformer 66 and the buffer memory 67 are designed in the same manner as the buffer memory 32, the horizontal-direction Hadamard transformer 33, the horizontal-direction Hadamard inverse transformer 46 and the buffer memory 47 shown in FIG. 8. The vertical-direction Hadamard transformer 55 and the vertical-direction Hadamard inverse transformer 64 have the same construction as the vertical-direction Hadamard transformer 35 and the vertical-direction Hadamard inverse transformer 44 except that the input/output bit width is increased by 3 bits. The two-dimensional bit delete unit 56 serves to delete bits in a two-dimensional block.

In the two-dimensional Hadamard transform coding apparatus and the two-dimensional Hadamard transform decoding apparatus shown in FIG. 10, the Hadamard transform in the vertical direction may be performed in the Hadamard transformer 53 while the Hadamard transform in the horizontal direction is performed in the Hadamard transformer 55. Further, the Hadamard transform in the horizontal direction may be performed in the Hadamard inverse transformer 64 while the Hadamard transform in the vertical direction is performed in the Hadamard inverse transformer 66. The transform processing direction of the Hadamard transformers 53, 55 and the transform processing direction of the Hadamard inverse transformers 64, 66 may be set independently of each other.

Figure 11:
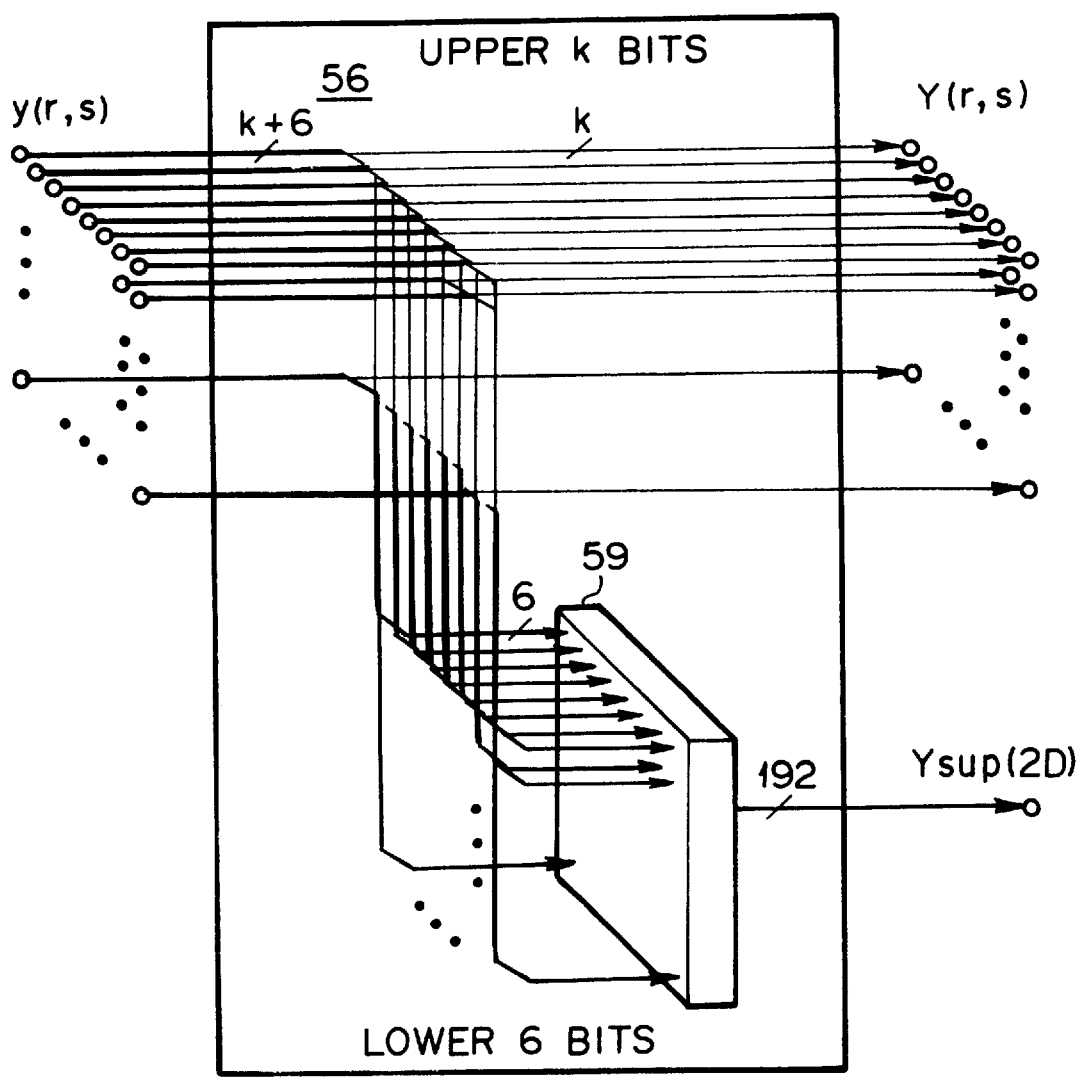
FIG. 11 is a block diagram showing the construction of a bit delete unit of FIG. 8.

FIG. 11 is a block diagram showing the construction of the two-dimensional bit delete unit 56. The two-dimensional bit delete unit 56 directly outputs input transform coefficients of upper bits Y(0,0) to Y(7,7) from which the lower six bits of 8 columns×8 lines y(0,0) to y(7,7) are removed. With respect to the lower six bits of the transform coefficients y(0,0) to y(7,7), 192 bits are selected per block in a bit selector 59, and output as supplement information Ysup (2D). 192 bits selected by the bit selector 59 comprises 1 bit which is selected from the least significant bits of the respective transform coefficients y(0,0) to y(7,7), 7 bits selected from the second least significant bits, 22 bits selected from the third least significant bits, 42 bits selected from the fourth least significant bits, 57 bits selected from the fifth least significant bits, and 63 bits selected from the sixth least significant bits.

FIGS. 13A to 13F are diagrams showing bit positions which are selected from each bit plane in the bit selector 59. With respect to the least significant bits, the same output is obtained even when the bits of the transform coefficients other than y(0,0) are selected. With respect to the sixth least significant bits, even when the transform coefficient not to be selected is set to any transform coefficient other than y(7,7), the same effect can be obtained by some treatment at the decoding side. With respect to the other bit planes, the same effect can be obtained by some treatment at the decoding side even when transform coefficients other than those shown in FIGS. 13B to 13E if those bits which are deleted in consideration of the bit pattern correlation of the transform coefficients y(0,0) to y(7,7) are a combination of restorable bits.

Figure 12:
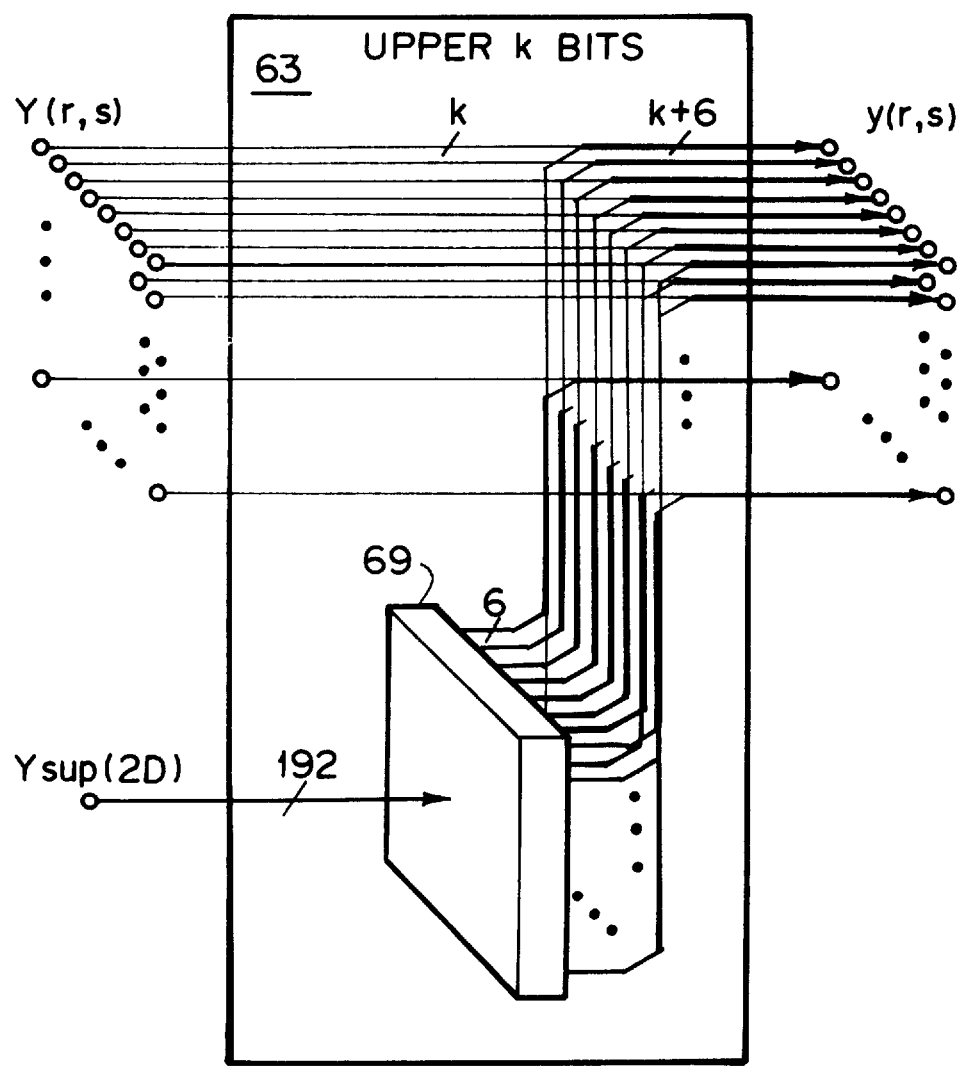
FIG. 12 is a block diagram showing the construction of a bit restoring unit of FIG. 8.

FIG. 12 is a block diagram showing the construction of the two-dimensional bit restoring unit 63. In the two-dimensional bit restoring unit 63, the output of the bit supplement unit 69 is added as the lower bits to the upper bits Y(0,0) to Y(7,7) of the respective transform coefficients y(0,0) to y(7,7), and the result is output from the two-dimensional bit restoring unit 63. The bit supplement unit 69 performs the processing corresponding to the bit selector 59 of FIG. 11 to restore the lower 6 bits of each transform coefficient on the basis of the supplement information Ysup (2D). The bit supplement unit 69 decomposes the supplement information Ysup(2D) into 1-bit information on the least significant bits, 7-bit information on the second least significant bits, 22-bit information of the third least significant bits, 42-bit information of the fourth least significant bits, 57-bit information of the fifth least significant bits, and 63-bit information of the sixth least significant bits, and then performs a bit supplement operation on each bit plane.

Figure 15:
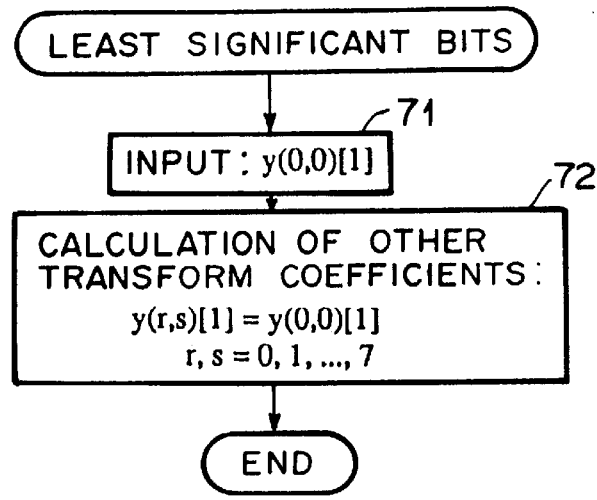
FIG. 15 is a flowchart showing supplemental processing of the least significant bits in a bit supplement unit of FIG. 12.

FIG. 15 is a flowchart showing a supplement procedure of the least significant bits. First, in step 71, the 1-bit information per block which represents the least significant bits is input (y(0,0)[1]), and then in step 72 the input 1-bit information y(0,0)[1] is copied to the least significant bits y(0, 0)[1] to y(7,7)[1] of all the transform coefficients y(0,0) to y(7,7).

Figure 16:
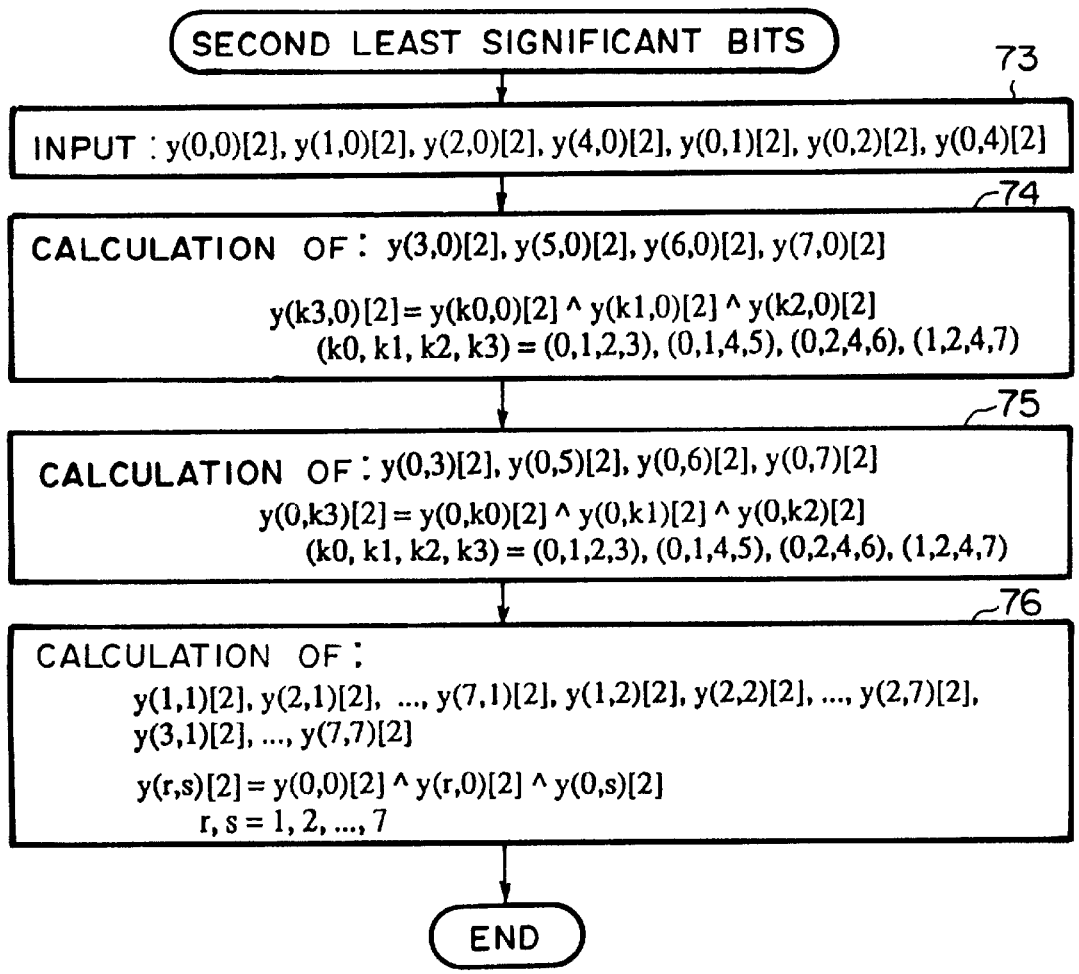
FIG. 16 is a flowchart showing supplemental processing of the second least significant bits in the bit supplement unit of FIG. 12.

FIG. 16 is a flowchart showing a supplement procedure of the second least significant bits. First, in step 73, the 7-bit information per block which represent the second least significant bits of the transform coefficients y(0,0) to y(7,7) (y(0,0)[2], y(1,0)[2], y(2,0)[2], y(4,0)[2], y(0,1)[2], y(0,2)[2], y(0,4)[2]) is input. Subsequently, in steps 74 and 75, eight bits which are missed at the side portion of the block: y(3,0)[2], y(5,0)[2], y(6,0)[2], y(7,0)[2], y(0,3)[2], y(0,5)[2], y(0,6)[2] and y(0,7)[2], are supplemented in consideration of the fact that the exclusive OR operation on a appropriate four transform coefficients in a column or line is equal to zero. Subsequently, in step 76, the residual 49 bits: y(1,1)[2], y(2,1)[2], ..., y(7,1)[2], y(1,2)[2], y(2,2)[2], ..., y(2,7)[2], y(3,1)[2], ..., y(7,7)[2] are supplemented in consideration of the fact that the exclusive OR operation on four transform coefficients on a grid location is equal to zero.

FIG. 17 is a flowchart showing a supplement procedure of the third least significant bits. First, in step 77, the 22-bit information per block representing the third least significant bits of the transform coefficients y(0,0) to y(7,7): y(0,0)[3], y(0,6)[3], y(1,0)[3], ..., y(1,2)[3], y(1,4)[3], y(2,0)[3], ..., y(2,2)[3], y(2,4)[3], y(3,0)[3], y(4,0)[3], ..., y(4,2)[3], y(4,4)[3], y(5,0)[3], and y(6,0)[3] are input. Subsequently, in step 78, 9 bits in a block of y(3,1)[3], y(5,1)[3], y(6,1)[3], y(3,2)[3], y(5,2)[3], y(6,2)[3], y(3,4)[3], y(5,4)[3] and y(6, 4)[3] are supplemented in consideration of the fact that the exclusive OR operation on eight transform coefficients of appropriate two columns×four lines is equal to zero. Subsequently, in step 79, 18 bits of y(1,3)[3], y(2,3)[3], ..., y(6,3)[3], y(1,5)[3], y(2,5)[3], ..., y(6,5)[3], y(1,6)[3], y(2,6)[3], ..., y(6,6)[3] are supplemented in consideration of the fact that the exclusive OR operation on eight transform coefficients of appropriate four columns×two line is equal to zero. Through the above operation, the bits of 7 columns×7 lines in a block are specified. In step 80, 7 bits at the side portion of the block: y(7,0)[3], y(7,1)[3], ..., y(7,6)[3] are supplemented in consideration of the fact that the exclusive OR operation on eight transform coefficients in a column is equal to zero. In step 81, the residual 8 bits of y(0,7)[3], y(1,7)[3], ..., y(7,7)[3] are supplemented in consideration of the fact that the exclusive OR operation on eight transform coefficients in a line.

FIG. 18 is a flowchart showing a supplement procedure of the fourth least significant bits. In step 82, the transform coefficients whose third least significant bits are supplemented according to the procedure of FIG. 17 are prepared, and 42-bit information per block representing the fourth least significant bits of the transform coefficients y(0,0) to y(7,7): y(0,0)[4], ..., y(0,7)[4], y(1,0)[4], ..., y(1,6)[4], y(2,0)[4], ..., y(2,6)[4], y(3,0)[4], ..., y(3,2)[4], y(3,4)[4], y(4,0)[4], ..., y(4,6)[4], y(5,0)[4], ..., y(5,2)[4], y(5,4)[4], y(6,0)[4], ..., y(6,2)[4], y(6,4)[4], y(7,0)[4] are input. Subsequently, in step 83, the input 42-bit information is set to the fourth least significant bits of predetermined transform coefficients. Undetermined bits are set to zero. In step 84, 9 bits in a block: y(3,3)[4], y(5,3)[4], y(6,3)[4], y(3,5)[4], y(5,5)[4], y(6,5)[4], y(3,6)[4], y(5,6)[4], y(6,6)[4] are first supplemented in consideration of the fact that the sum of 16 transform coefficients of appropriate four columns×four lines is equal to a multiple of 16. In FIG. 18, f[m]{.} represents a function of cutting out an input m-th bit. Subsequently, in step 85, 6 bits at the side portion of the block: y(7,1)[4], y(7,2)[4], ..., y(7,6)[4] are supplemented in consideration of the fact that the sum of 16 transform coefficients of appropriate two columns×eight lines is equal to a multiple of 16. In step 86, the residual 7 bits of y(1,7)[4], y(2,7)[4], ..., y(7,7)[4] are supplemented in consideration of the fact that the sum of 16 transform coefficients of appropriate eight columns×two lines is equal to a multiple of 16. The calculation of the sum of four columns×four lines, two columns×eight lines, and eight columns×two lines of the transform coefficients can be performed by calculating only on two bits of the fourth least significant bit and the third least significant bit.

FIG. 19 is a flowchart showing a supplement procedure of the fifth least significant bits. In step 87, the transform coefficients whose fourth and third least significant bits are supplemented according to the procedure shown in FIGS. 18 and 19 are prepared, and 57-bit information per block representing the fifth least significant bits of the transform coefficients y(0,0) to y(7,7): y(0,0)[5], ..., y(0,7)[5], y(1,0)[5], ..., y(1,7)[5], y(2,0)[5], ..., y(2,7)[5], y(3,0)[5], ..., y(3,6)[5], y(4,0)[5], ..., y(4,7)[5], y(5,0)[5], ..., y(5,6)[5], y(6,0)[5], ..., y(6,6)[5], y(7,0)[5], ..., y(7,2)[5], y(7,4)[5] are input. Subsequently, in step 88, the input 57-bit information is set to the fifth least significant bits of predetermined transform coefficients y(0,0) to y(7,7). Undetermined bits are set to zero. In step 89, 3 bits at the side portion of the block: y(7,3)[5], y(7,5)[5], y(7,6)[5] are first supplemented in consideration of the fact that the sum of 32 transform coefficients of appropriate four columns×eight lines is equal to a multiple of 32, and then in step 90, the residual 4 bits of y(3,7)[5], y(5,7)[5], y(7,6)[5] and y(7,7)[5] are supplemented in consideration of the fact that the sum of 32 transform coefficients of appropriate eight columns×four lines is equal to a multiple of 32. The calculation of the sum of four columns×eight lines, and eight columns×four lines of the transform coefficients is performed by calculating only on three bits of the fifth to the third least significant bit.

Figure 20:
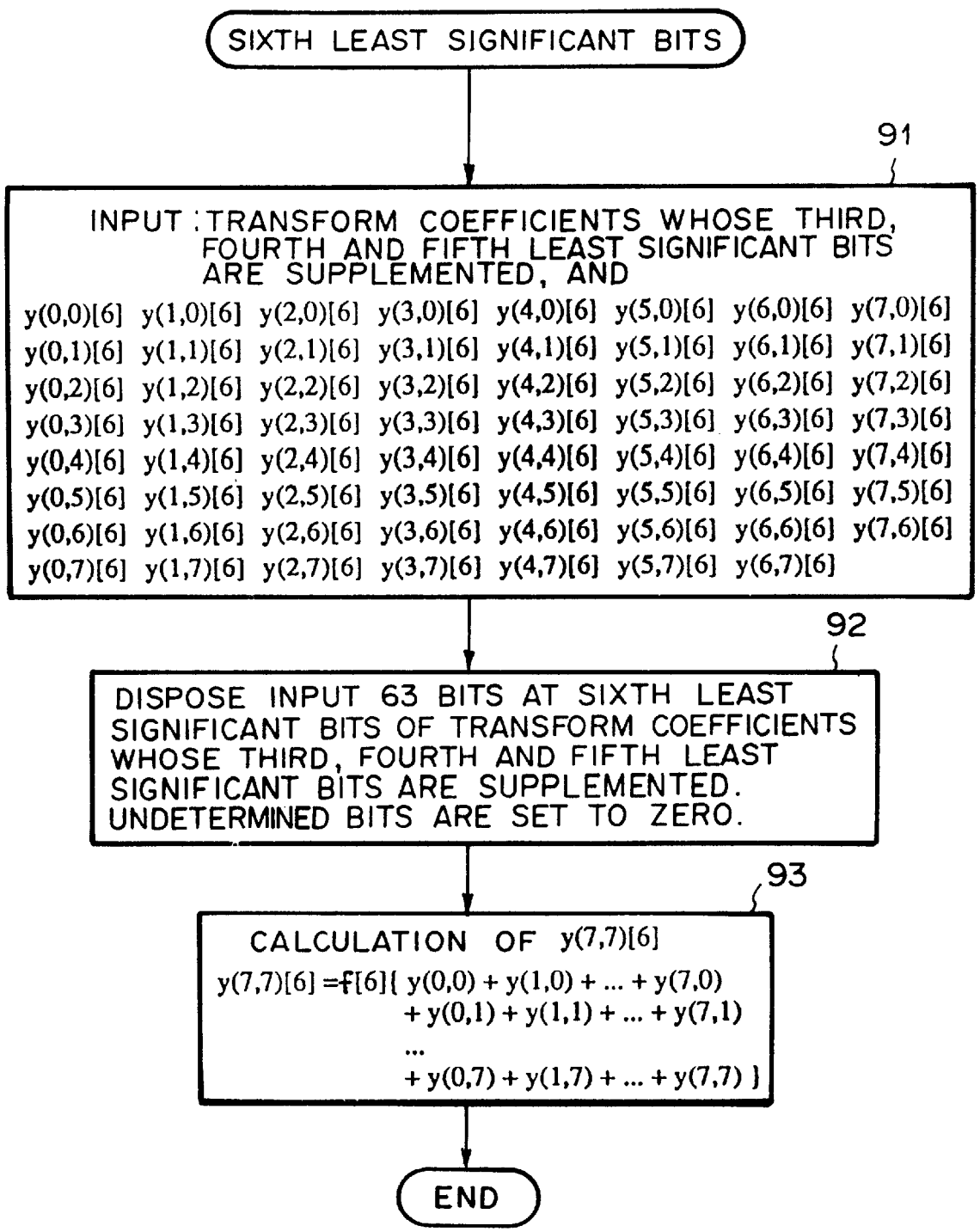
FIG. 20 is a flowchart showing supplemental processing of the sixth least significant bits in the bit supplement unit of FIG. 12.

FIG. 20 is a flowchart for a supplement procedure of the sixth least significant bit. In step 91, the transform coefficients whose third, fourth and fifth least significant bits are supplemented according to the procedure shown in FIGS. 17 to 19 are prepared, and 63-bit information per block representing the sixth least significant bits of the transform coefficients y(0,0) to y(7,7): y(0,0)[6], ..., y(0,7)[6], y(1,0)[6], ..., y(1,7)[6], y(2,0)[6], ..., y(2,7)[6], y(3,0)[6], ..., y(3,7)[6], y(4,0)[6], ..., y(4,7)[6], y(5,0)[6], ..., y(5,7)[6], y(6,0)[6], y(6,7)[6], y(7,0)[6], ..., y(7,6)[6] are input. Subsequently, in step 92, the input 63-bit information is set to the sixth least significant bits of predetermined transform coefficients. Undetermined bits are set to zero. In step 93, the missing 1 bit y(7,7)[6] is calculated in consideration of the fact that the sum of all the transform coefficients y(0,0) to y(7,7) is equal to a multiple of 64. The calculation of the sum of the transform coefficients is performed by calculating only on four bits of the sixth to the third least significant bit.

The variable-length coder 57 is designed to have the same construction as the variable-length coder 37 except that the bit width of the upper bits of the input transform coefficients is increased by 3 bits, and the supplement information is Ysup(2D). The supplement information Ysup(2D) may be coded while separated from the upper bits of the transform coefficients, or coded while affixing the supplement information Ysup to the upper significant bits. That is, each bit of the supplement information is located at an original bit position for the transform coefficients, and "0" is located for those bits which are deleted in the bit delete unit 56.

Alternatively, the upper bits are shifted down at the bit-deleted positions, and subjected to the variable-length coding as the transform coefficients. Since the supplement information Ysup(2D) is just 3 bits per transform coefficient, for example, it may be adopted that three bit planes are prepared as shown in FIGS. 14a, 14B and 14C, affixed to the transform coefficients as the lower 3 bits and then subjected to the variable-length coding.

As described above, according to the one-dimensional Hadamard transform coding/decoding method of this invention, in the coding operation, the transform coefficients are recorded or transmitted while the first, second and third least significant bits of the transform coefficients are reduced to 1 bit per block, 4 bits per block and 7 bits per block respectively. In the decoding operation, the least significant bits of all the transform coefficients are supplemented on the basis of the 1-bit information per block representing the least significant bits of the transform coefficients, the second least significant bits of all the transform coefficients are supplemented on the basis of the 4-bit information per block representing the second least significant bits of the transform coefficients, and the third least significant bits of all the transform coefficients are supplemented on the basis of the 7-bit information per block representing the third least significant bits of the transform coefficients. Therefore, a memory capacity required to record the transform coefficient information (transform coefficients+supplement information) or a line capacity required to transmit the transform coefficient information can be reduced.

According to the one-dimensional Hadamard transform coding apparatus of this invention, by providing the blocking means, the Hadamard transform means, the bit delete means and the recording/transmitting means, the one-dimensional Hadamard transform coding apparatus which realizes the one-dimensional Hadamard transform coding/decoding method as described above can be readily provided.

Further, according to the one-dimensional Hadamard transform decoding apparatus, by providing the reproducing/receiving means, the bit supplement means, the Hadamard inverse transform means and the image signal output means, the one-dimensional Hadamard transform decoding apparatus can be obtained which realizes the one-dimensional Hadamard transform coding/decoding method as described above.

According to the two-dimensional Hadamard transform coding/decoding method of this invention, in the coding operation, after the Hadamard transform processing in one direction is performed, the least significant bits of the transform coefficients are reduced to 1 bit per group, the second least significant bits are reduced to 4 bits per group and the third least significant bits are reduced to 7 bits per group. Further, after the Hadamard transform processing in the other direction is performed, the transform coefficients are recorded or transmitted while the least significant bits of the transform coefficients are reduced to 1 bit per group, the second least significant bits are reduced to 4 bits per group, and the third least significant bits are reduced to 7 bits per group. On the other hand, in the decoding operation, after the Hadamard inverse transform processing in the other direction is performed, the least significant bits of all the transform coefficients are supplemented on the basis of the 1-bit information per group representing the least significant bits of the transform coefficients, the second least significant bits of all the transform coefficients are supplemented on the basis of the 4-bit information per group representing the second least significant bits of the transform coefficients, and the third least significant bits of all the transform coefficients are supplemented on the basis of the 7-bit information per group representing the third least significant bits of the transform coefficients. Further, after the Hadamard inverse transform processing in one direction is performed, the least significant bits of all the transform coefficients are supplemented on the basis of the 1-bit information per group representing the least significant bits of the transform coefficients, the second least significant bits of all the transform coefficients are supplemented on the basis of the 4-bit information per group representing the second least significant bits of the transform coefficients, and the third least significant bits of all the transform coefficients are supplemented on the basis of the 7-bit information per group representing the third least significant bits of the transform coefficients. Therefore, the memory capacity required to record the transform coefficient information or the line capacity required to transmit the transform coefficient information can be reduced.

According to the two-dimensional Hadamard transform coding apparatus of this invention, by providing the blocking means, the first Hadamard transform means, the first bit delete means, the second Hadamard transform means, the second bit delete means and the recording/transmitting means, the two-dimensional Hadamard transform coding apparatus can be obtained which realizes the two-dimensional Hadamard transform coding/decoding method as described above.

According to the two-dimensional Hadamard transform decoding apparatus of this invention, by providing the reproducing/receiving means, the first bit supplement means, the first Hadamard inverse transform means, the second bit supplement means, the second Hadamard inverse transform means and the image signal output means, the two-dimensional Hadamard transform decoding apparatus can be obtained which realizes the two-dimensional Hadamard transform coding/decoding method as described above.

According to the two-dimensional Hadamard transform coding/decoding method of this invention, in the coding operation, the transform coefficients are recorded or transmitted while the least significant bits of the transform coefficients are reduced to 1 bit per block, the second least significant bits are reduced to 7 bits per block, the third least significant bits are reduced to 22 bits per block, the fourth least significant bits are reduced to 42 bits per block, the fifth least significant bits are reduced to 57 bits per block, and the sixth least significant bits are reduced to 63 bits per block. Further, in the decoding operation, the least significant bits of all the transform coefficients are supplemented on the basis of the 1-bit information per block representing the least significant bits of the transform coefficients, the second least significant bits of all the transform coefficients are supplemented on the basis of the 7-bit information per block representing the second least significant bits of the transform coefficients, the third least significant bits of all the transform coefficients are supplemented on the basis of the 22-bit information per block representing the third least significant bits of the transform coefficients, the fourth least significant bits of all the transform coefficients are supplemented on the basis of the 42-bit information per block representing the fourth least significant bits of the transform coefficients and the supplemented third least significant bits, the fifth least significant bits of all the transform coefficients are supplemented on the basis of the 57-bit information per block representing the fifth least significant bits of the transform coefficients and the supplemented third and fourth least significant bits, and the sixth least significant bits of all the transform coefficients are supplemented on the basis of the 63-bit information per block representing the sixth least significant bits of the transform coefficients and the supplemented third, fourth and fifth least significant bits. Therefore, the memory capacity required to record the transform coefficient information or the line capacity required to transmit the transform coefficient information can be reduced. In addition, the transform processing direction of the Hadamard transform can be independently set at each of the coding and decoding sides.

According to the two-dimensional Hadamard transform coding apparatus of this invention, by providing the blocking means, the two-dimensional Hadamard transform means, the two-dimensional bit delete means and the recording/transmitting means, the two-dimensional Hadamard transform coding apparatus can be obtained which realizes the two-dimensional Hadamard transform coding/decoding method as described above.

According to the two-dimensional transform decoding apparatus of this invention, by providing the reproducing/receiving means, the two-dimensional bit supplement means, the two-dimensional Hadamard inverse transform means and the image signal output means, the two-dimensional Hadamard transform decoding apparatus can be obtained which realizes the two-dimensional Hadamard transform coding/decoding method as described above.

What is claimed is:

1. A one-dimensional Hadamard transform coding/decoding method for image signals comprising:
   a blocking step of blocking an input image signal every 8 picture elements;
   an Hadamard transform step for performing an eighth-order Hadamard transform on picture element values which are blocked in said blocking step to obtain transform coefficients;
   a bit delete step for extracting, from predetermined positions in each block, 1 bit, 4 bits and 7 bits from the least significant bits, the second least significant bits and the third least significant bits respectively for the transform coefficients obtained in said Hadamard transform step to output the extracted bits as supplement information, and outputting the transform coefficients from which the least significant bits, the second least significant bits and the third least significant bits are deleted;
   a record/transmit step for recording or transmitting the supplement information and the transform coefficients from which the first, second and third least significant bits are deleted in said bit delete step;
   a reproduction/reception step for reproducing or receiving the recorded or transmitted transform coefficients and the supplement information;
   a bit supplement step for supplementing: according to the supplement information reproduced or received in said reproduction/reception step, the least significant bits of all the transform coefficients on the basis of information of 1 bit per block which represents the least significant bits of the transform coefficients; the second least significant bits of all the transform coefficients on the basis of information of 4 bits per block which represents the second significant bits of the transform coefficients; and the third least significant bits of all the transform coefficients on the basis of information of 7 bits per block which represents the third significant bits of the transform coefficients;
   an Hadamard inverse-transform step for performing an eighth-order Hadamard inverse-transform on the transform coefficients whose first, second and third least significant bits are supplemented in said bit supplement step, thereby obtaining picture element values; and
   an image signal output step for arranging the picture element values obtained in said Hadamard inverse-transform step into eight picture elements and outputting the arranged eight picture elements as an image signal.

2. A one-dimensional Hadamard transform coding apparatus for image signals comprising:
   blocking means for blocking an input image signal every 8 picture elements;
   Hadamard transform means for performing an eighth-order Hadamard transform on the picture elements blocked by said blocking means to obtain transform coefficients;
   bit delete means for extracting, from predetermined positions in each block, 1 bit, 4 bits and 7 bits from the least significant bits, the second least significant bits and the third least significant bits respectively for the transform coefficients obtained by said Hadamard transform means to output the extracted bits as supplement information, and outputting the transform coefficients from which the least significant bits, the second least significant bits and the third least significant bits are deleted; and
   record/transmit means for recording or transmitting the transform coefficients and the supplement information output from said bit delete means.

3. A one-dimensional Hadamard transform decoding apparatus for image signals comprising:
   reproduction/reception means for reproducing or receiving the recorded or transmitted transform coefficients and the supplement information;
   bit supplement means for supplementing: the least significant bits of all the transform coefficients on the basis of information of 1 bit per block which is a part of the supplement information and represents the least significant bits of the transform coefficients; the second least significant bits of all the transform coefficients on the basis of information of 4 bits per block which is a part of the supplement information and represents the second least significant bits of the transform coefficients; and the third least significant bits of all the transform coefficients on the basis of information of 7 bits per block which is a part of the supplement information and represents the third least significant bits of the transform coefficients;
   Hadamard inverse-transform means for performing an eighth-order Hadamard inverse-transform on the transform coefficients whose first, second and third least significant bits are supplemented in said bit supplement means, thereby obtaining picture element values; and
   image signal output means for arranging the picture element values obtained in said Hadamard inverse-transform means into eight picture elements and outputting the arranged eight picture elements as an image signal.

4. A two-dimensional Hadamard transform coding/decoding method comprising:
   a blocking step for blocking an input image signal every 8 picture elements×8 lines;
   a first Hadamard transform step for grouping the picture element values blocked in said blocking step into eight groups in any one of a column direction and a line direction and performing an eighth-order Hadamard transform on the picture element values of each group to obtain a first transform coefficient group;

a first bit delete step for reducing: for the first transform coefficient group obtained in said first Hadamard transform step, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and outputting a second transform coefficient group from which the first, second and third least significant bits are deleted;

a second Hadamard transform step for rearranging transform coefficients representing the same frequency component in each block to obtain new eight groups for the second transform coefficient group output in said first bit delete step, and performing an eighth-order Hadamard transform on transform coefficients belonging to each of the new groups to obtain a third transform coefficient group;

a second bit delete step for reducing: for the third transform coefficient group obtained in said second Hadamard transform step, the least significant bits of the transform coefficients to 1 bit per group; the second least significant bits of the transform coefficients to 4 bits per group; and the third least significant bits of the transform coefficients to 7 bits per group to output totally 96 bits per block as second supplement information, and outputting a fourth transform coefficient group from which the first, second and third least significant bits are deleted;

a recording/transmitting step for recording or transmitting the fourth transform coefficient group output in said second bit delete step, the first supplement information and the second supplement information;

a reproducing/receiving step for reproducing or receiving the recorded or transmitted fourth transform coefficient group, the first supplement information and the second supplement information;

a first bit supplement step for grouping the fourth transform coefficient group in accordance with the second supplement information obtained in said reproducing/receiving step and then supplementing: the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients to thereby restore the third transform coefficient group;

a first Hadamard inverse-transform step for performing an eighth-order Hadamard inverse-transform on the third transform coefficient group restored in said first bit supplement step every group to obtain the second transform coefficient group;

a second bit supplement step for rearranging, for the second transform coefficient group obtained in said first Hadamard inverse-transform step, transform coefficients located at the same position in the group every block to obtain new eight groups, and supplementing: for the transform coefficients of each group thus obtained, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients in accordance with the first supplement information obtained in said reproducing/receiving step to thereby restore the first transform coefficient group;

a second Hadamard inverse-transform step for performing an eighth-order Hadamard inverse-transform on the first transform coefficient group restored in said second bit supplement step every group to obtain picture element values; and an image signal output step for arranging the picture element values obtained in said second Hadamard inverse-transform step in a matrix of 8 picture elements×8 lines and outputting the arranged picture element values as an image signal.

5. A two-dimensional Hadamard transform coding apparatus comprising:

blocking means for blocking an input image signal every 8 picture elements×8 lines;

first Hadamard transform means for further grouping the picture element values blocked by said blocking means into eight groups in any one of a column direction and a line direction and performing an eighth-order Hadamard transform on the picture element values of each group to obtain a first transform coefficient group;

first bit delete means for reducing: for the first transform coefficient group obtained by said first Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as first supplement information, and outputting a second transform coefficient group from which the first, second and third least significant bits are deleted;

second Hadamard transform means for rearranging transform coefficients representing the same frequency component in each block to obtain new eight groups for the second transform coefficient group output in said first bit delete means, and performing an eighth-order Hadamard transform on transform coefficients belonging to each of the new groups to obtain a third transform coefficient group;

second bit delete means for reducing: for the third transform coefficient group obtained by said second Hadamard transform means, the least significant bits of the transform coefficients to 1 bit per group; the second least significant bits of the transform coefficients to 4 bits per group; and the third least significant bits of the transform coefficients to 7 bits per group to output totally 96 bits per block as second supplement information, and outputting a fourth transform coefficient group from which the first, second and third least significant bits are deleted; and recording/transmitting means for recording or transmitting the fourth transform coefficient group output from said second bit delete means, the first supplement information and the second supplement information.

6. A two-dimensional Hadamard transform decoding apparatus for image signals comprising:

reproducing/receiving means for reproducing or receiving recorded or transmitted first transform coefficient group and two pairs of supplement information;

first bit supplement means for grouping the first transform coefficient group in accordance with one pair of the two pairs of the supplement information into eight groups each containing eight transform coefficients, and then supplementing: every group, the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients;

first Hadamard inverse-transform means for performing an eighth-order Hadamard inverse-transform on the second transform coefficient group whose first, second and third least significant bits are supplemented by the first bit supplement means, every group when the bit supplement is completed, thereby obtaining a third transform coefficient group;

second bit supplement means for grouping the third transform coefficient group obtained by said first Hadamard inverse-transform means into eight groups in accordance with the other pair of the two pairs of the supplement information, and then supplementing; the least significant bits of all the transform coefficients on the basis of 1-bit information per group representing the least significant bits of the transform coefficients; the second least significant bits of all the transform coefficients on the basis of 4-bit information per group representing the second least significant bits of the transform coefficients; and the third least significant bits of all the transform coefficients on the basis of 7-bit information per group representing the third least significant bits of the transform coefficients;

second Hadamard inverse-transform means for performing an eighth-order Hadamard inverse-transform on the fourth transform coefficient group whose first, second and third least significant bits are supplemented by the second bit supplement means, every group when the second bit supplement is completed, thereby obtaining picture element values; and image signal output means for arranging the picture element values obtained in said second Hadamard inverse-transform means in a matrix of 8 picture elements×8 lines and outputting the arranged picture element values as an image signal.

7. A two-dimensional Hadamard transform coding/decoding method comprising:

a blocking step for blocking an input image signal every 8 picture elements×8 lines;

a two-dimensional Hadamard transform step for performing a vertical and lateral separation type two-dimensional (8×8)th-order Hadamard transform on picture elements of each block blocked by the blocking step which are blocked in the blocking step to obtain a first transform coefficient group;

a two-dimensional bit delete step for reducing; for the first transform coefficient group obtained in the two-dimensional Hadamard transform step, the least significant bits of the transform coefficients to 1 bit per block; the second least significant bits of the transform coefficients to 7 bits per block; the third least significant bits of the transform coefficients to 22 bits per block; the fourth least significant bits to 42 bits per block; the fifth least significant bits to 57 bits per block; and the sixth least significant bits to 63 bits per block to output totally 192 bits per block as supplement information, and outputting a second transform coefficient group from which the first to sixth least significant bits are deleted;

a recording/transmitting step for recording or transmitting the second transform coefficient group whose first to sixth least significant bits are deleted in said two-dimensional bit delete step and the supplement information;

a reproducing/receiving step for reproducing or receiving the recorded or transmitted second transform coefficient group and the supplement information;

a two-dimensional bit supplement step for supplementing; for th second transform coefficient group reproduced or received in said reproducing/receiving step and on the basis of the supplement information; the least significant bits of all the transform coefficients on the basis of 1-bit information per block representing the least significant bits of the transform coefficients; the second least significant bits of all the transform coefficients on the basis of 7-bit information per block representing the second least significant bits of the transform coefficients; the third least significant bits of all the transform coefficients on the basis of 22-bit information per block representing the third least significant bits of the transform coefficients; the fourth least significant bits of all the transform coefficients on the basis of 42-bit information per block representing the fourth least significant bits of the transform coefficients and the supplemented third least significant bits; the fifth least significant bits of all the transform coefficients on the basis of 57-bit information per block representing the fifth least significant bits of the transform coefficients and the supplemented third and fourth least significant bits; and the sixth least significant bits of all the transform coefficients on the basis of 63-bit information per block representing the sixth least significant bits of the transform coefficients and the supplemented third, fourth and fifth least significant bits, thereby restoring the first transform coefficient group;

a two-dimensional Hadamard inverse-transform step for performing a vertical and lateral separation type two-dimensional (8×8)th-order Hadamard inverse-transform on the first transform coefficient group restored in said two-dimensional bit supplement step to obtain picture element values; and an image signal output step for arranging the picture element values obtained in said two-dimensional Hadamard inverse-transform step in a matrix of 8 picture elements×8 lines and outputting the arranged picture element values as an image signal.

8. A two-dimensional Hadamard transform coding apparatus comprising:

blocking means for blocking an input image signal every 8 picture elements×8 lines;

two-dimensional Hadamard transform means for performing a vertical and lateral separation type two-dimensional (8×8)th-order Hadamard transform on picture elements of each block blocked by the blocking means which are blocked by said blocking means to obtain a first transform coefficient group;

two-dimensional bit delete means for extracting: for the first transform coefficient group obtained by said two-dimensional Hadamard transform means, 1 bit from the least significant bits of the transform coefficients; 7 bits from the second least significant bits of the transform coefficients; 22 bits from the third least significant bits of the transform coefficients; 42 bits from the fourth least significant bits; 57 bits from the fifth least significant bits; and 63 bits from the sixth least significant bits from predetermined positions in each block to output the extracted bits as supplement information, and outputting a second transform coefficient group from which the first to sixth least significant bits are deleted; and recording/transmitting means for recording or transmitting the second transform coefficient group whose first to sixth least significant bits are deleted and which are output from said two-dimensional bit delete means and the supplement information.

9. A two-dimensional Hadamard transform decoding apparatus comprising:

reproducing/receiving means for reproducing or receiving a recorded or transmitted first transform coefficient group and supplement information;

two-dimensional bit supplement means for supplementing: for the first transform coefficient group reproduced or received by said reproducing/receiving means; the least significant bits of all the transform coefficients on the basis of 1-bit information per block of the supplement information, which represents the least significant bits of the transform coefficients; the second least significant bits of all the transform coefficients on the basis of 7-bit information per block of the supplement information, which represents the second least significant bits of the transform coefficients; the third least significant bits of all the transform coefficients on the basis of 22-bit information per block of the supplement information, which represents the third least significant bits of the transform coefficients; the fourth least significant bits of all the transform coefficients on the basis of 42-bit information per block of the supplement information, which represents the fourth least significant bits of the transform coefficients, and the supplemented third least significant bits; the fifth least significant bits of all the transform coefficients on the basis of 57-bit information per block of the supplement information, which represents the fifth least significant bits of the transform coefficients, and the supplemented third and fourth least significant bits; and the sixth least significant bits of all the transform coefficients on the basis of 63-bit information per block of the supplement information, which represents the sixth least significant bits of the transform coefficients, and the supplemented third, fourth and fifth least significant bits; two-dimensional Hadamard inverse-transform means for performing a vertical and lateral separation type two-dimensional (8×8)th-order Hadamard inverse-transform on the second transform coefficient group whose first to sixth least significant bits are supplemented by said two-dimensional bit supplement means to obtain picture element values; and image signal output means for arranging the picture element values obtained by said two-dimensional Hadamard inverse-transform means in a matrix of 8 picture elements×8 lines and outputting the arranged picture element values as an image signal.

10. A Hadamard transform coding/decoding system having a Hadamard transformer and a Hadamard inverse transformer comprising:

a first buffer memory for storing an image signal;

a Hadamard transformer for receiving the image signal from said first buffer memory, and, for blocks of picture elements, performing an N-th order Hadamard transform on the received image signal;

a bit delete unit for deleting predetermined bits from transform coefficients which are output from said Hadamard transformer to obtain upper bits of said transform coefficients and supplement information which is selected from lower significant bits of said transform coefficients;

a variable-length coder for performing a variable-length coding according to an appearance frequency of data values on said upper bits of said transform coefficients and on said supplement information which are received from said bit delete unit;

a variable-length decoder for performing an inverse processing to that of said variable-length coder on output of said variable-length coder, and outputting upper bits and the supplement information;

a bit restoring unit for restoring the deleted bits of the transform coefficients on the basis of the supplement information and a bit pattern correlation between transform coefficients;

a Hadamard inverse transformer for performing an N-th order Hadamard inverse transform on transform coefficients received from said bit restoring unit to output picture element values; and a second buffer memory for storing the picture element values of said Hadamard inverse transformer.

11. The Hadamard transform coding/decoding system of claim 10, further comprising means for converting the picture element values stored in said second buffer memory from parallel data to serial data.

* * * * *